United States Patent
Yamazaki et al.

(10) Patent No.: US 6,854,526 B2
(45) Date of Patent: Feb. 15, 2005

(54) WALK-BEHIND AGRICULTURAL WORKING MACHINE

(75) Inventors: Nobuo Yamazaki, Wako (JP); Hironori Nishie, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/702,537

(22) Filed: Nov. 6, 2003

(65) Prior Publication Data

US 2004/0149457 A1 Aug. 5, 2004

(30) Foreign Application Priority Data

Dec. 27, 2002  (JP) .......................................... 2002-381361
Dec. 27, 2002  (JP) .......................................... 2002-381920
Jan. 16, 2003  (JP) .......................................... 2003-008464

(51) Int. Cl.[7] .......................................... A01B 59/042
(52) U.S. Cl. .......................... 172/42; 172/122; 172/123; 172/140; 172/184; 172/195; 172/348; 172/361; 172/362; 172/363; 172/364; 172/366; 172/417; 172/683
(58) Field of Search .......................... 172/42, 118–123, 172/329, 351, 331–348, 361–369, 417, 483, 605, 661, 662, 681, 677–680, 683, 684.5, 140, 184, 195

(56) References Cited

U.S. PATENT DOCUMENTS 5,640,914 A  *  6/1997  Rawson ....................... 111/140
6,347,593 B1 *  2/2002  Moran et al. ................ 111/133

FOREIGN PATENT DOCUMENTS

JP          10225205      8/1998
JP          01238504      9/2001

* cited by examiner

Primary Examiner—Christopher J. Novosad
(74) Attorney, Agent, or Firm—Adams & Wilks

(57) ABSTRACT

A walk-behind working machine has a machine body and a wheel mounted on the machine body for undergoing rotation to move the walk-behind working machine along a ground surface. A cultivator device is mounted on the machine body for cultivating the ground. A working device attachment is removably connected to the machine body for working the ground. A connection mechanism removably connects the working device attachment to the machine body. The connection mechanism has a pair of link members each pivotally connected at a first end portion thereof to the working device attachment and a control unit for controlling a position of the working device attachment with respect to the ground surface so that when the working operation, the first end portions of the link members are disposed closer to the ground surface than the second end portions of the link members.

10 Claims, 22 Drawing Sheets

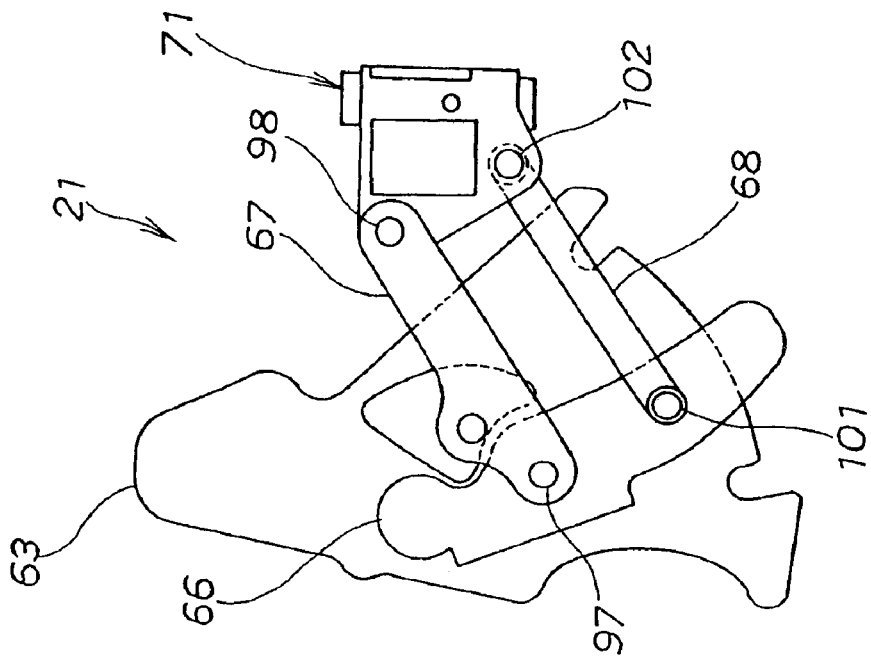
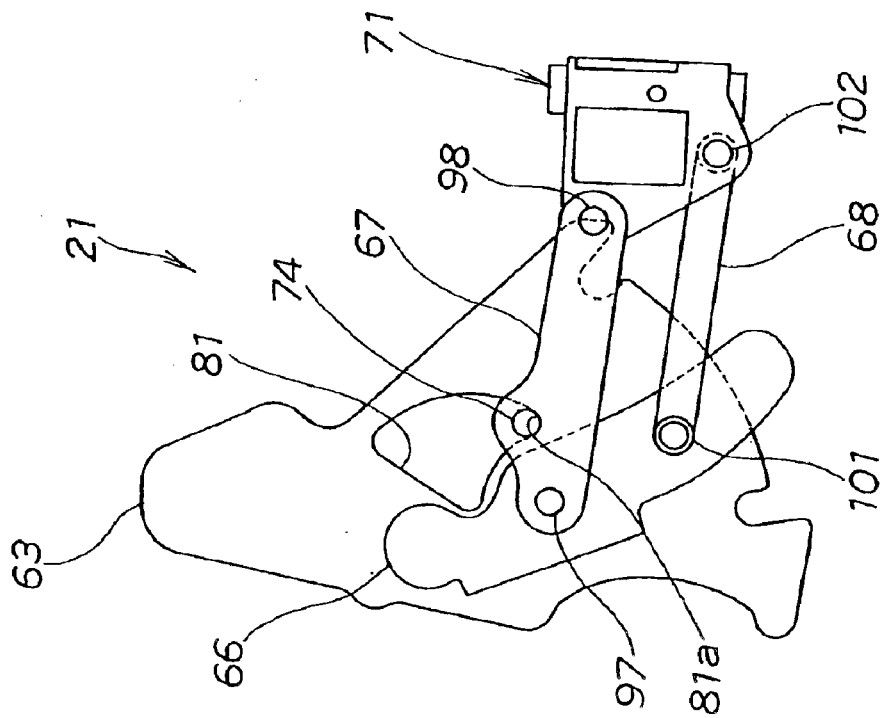

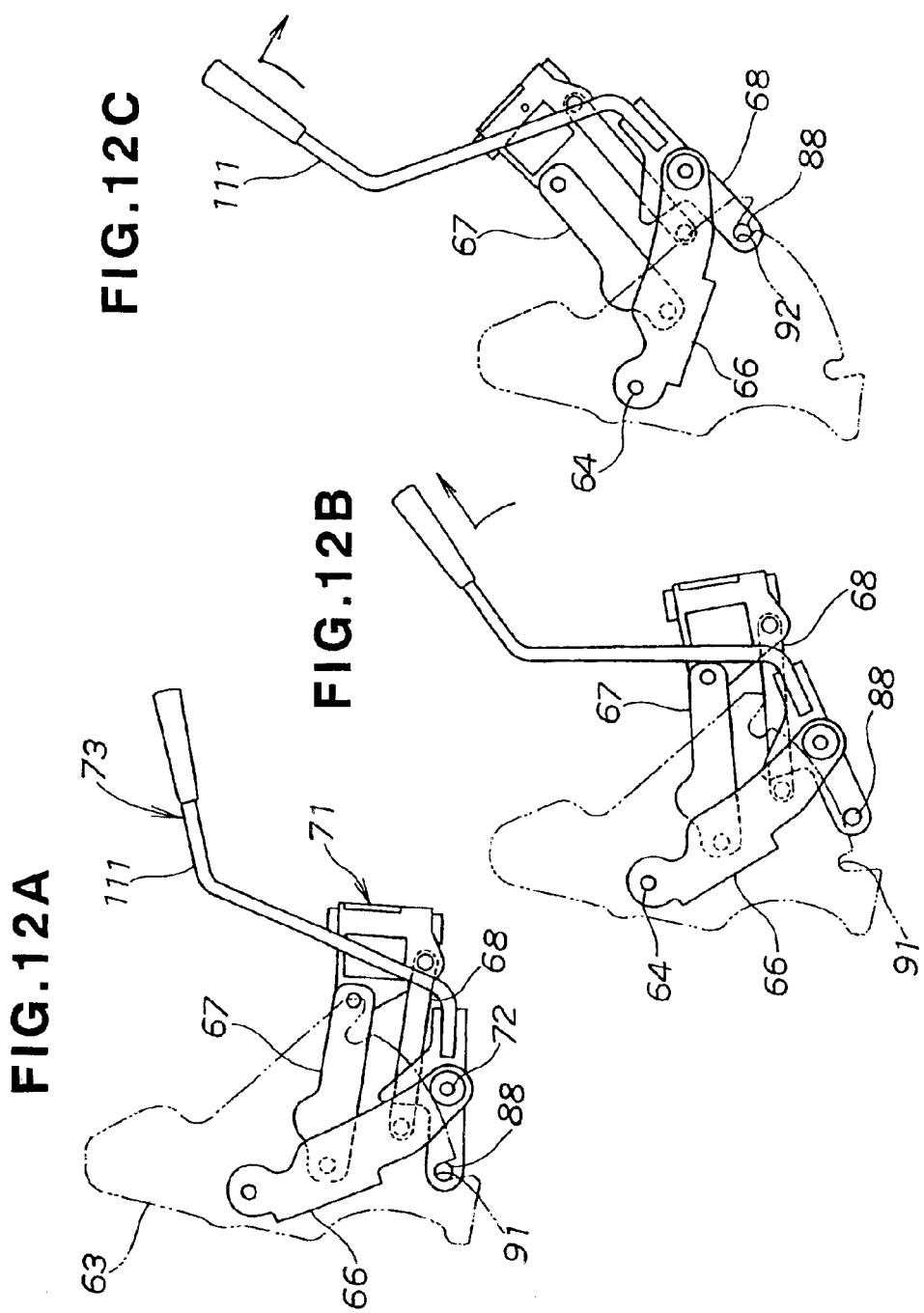

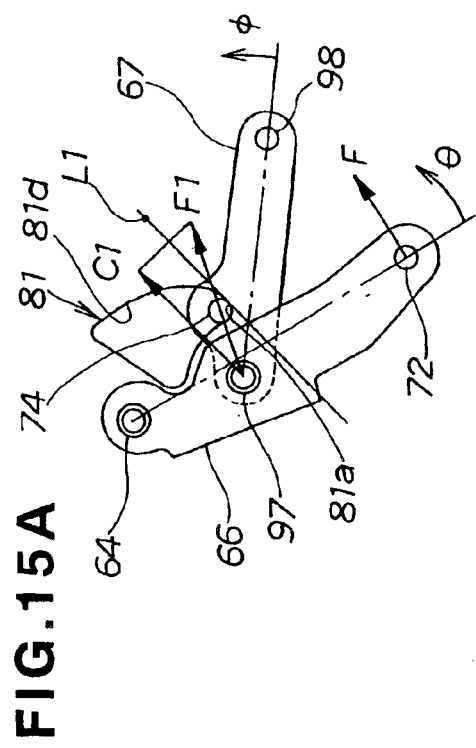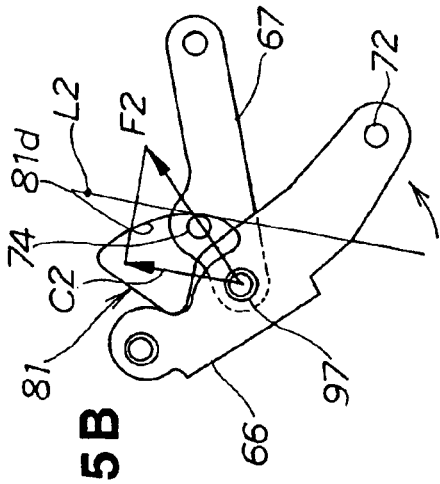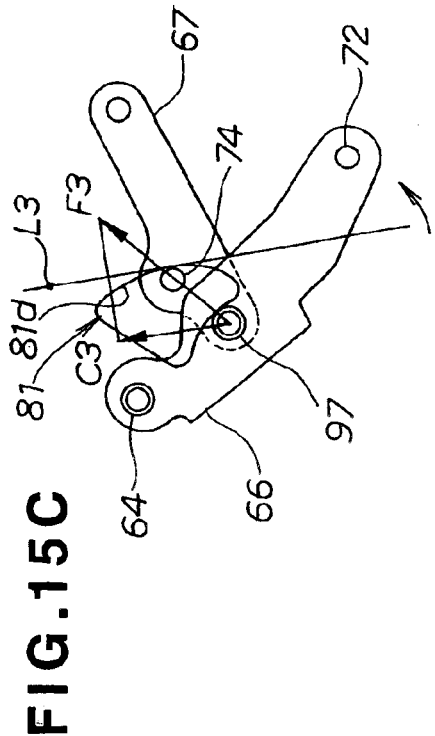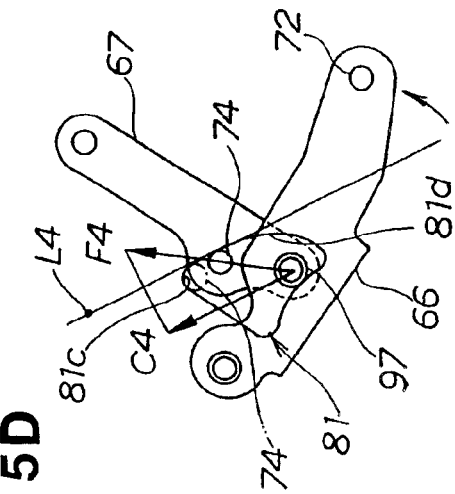
FIG.15A  FIG.15B  FIG.15C  FIG.15D

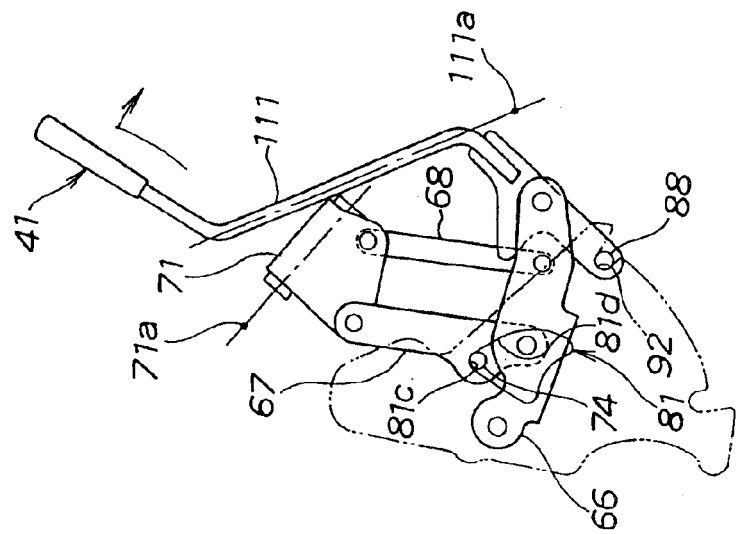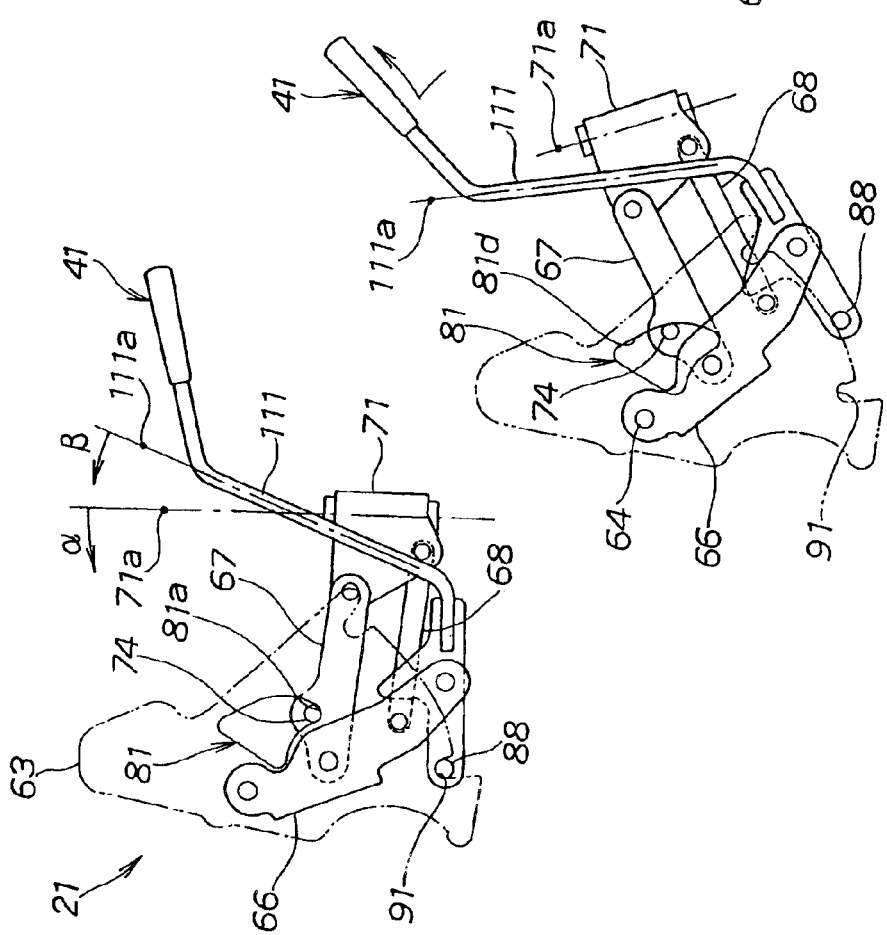

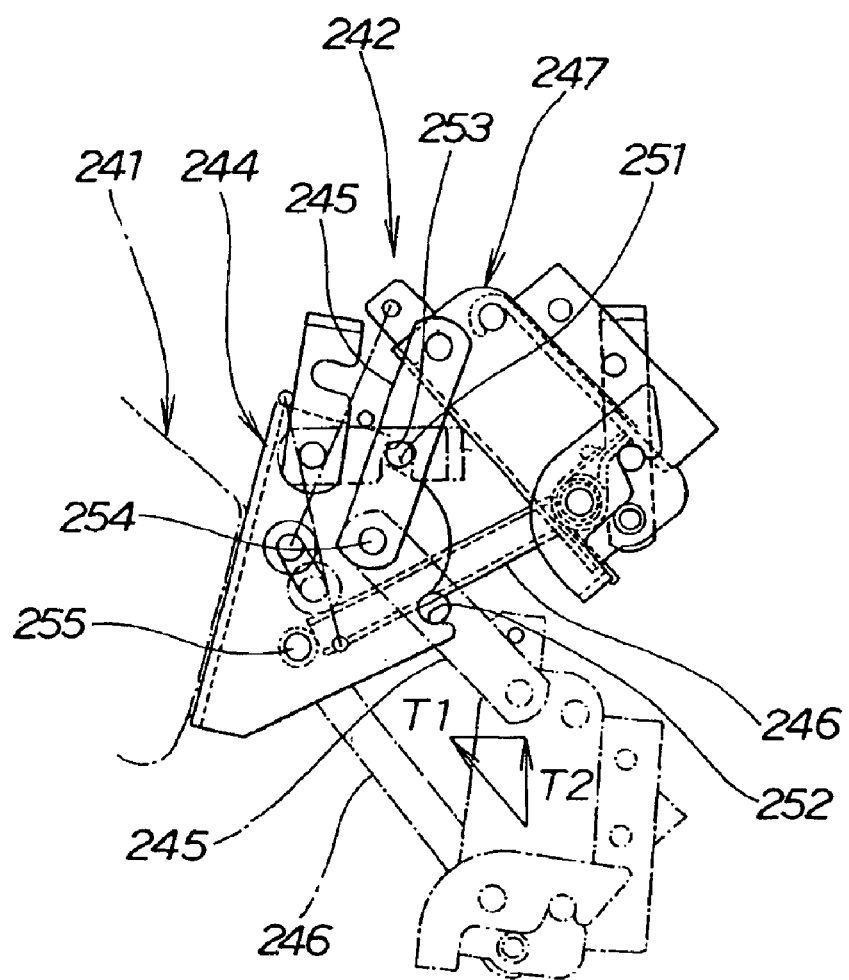

WALK-BEHIND AGRICULTURAL WORKING MACHINE

FIELD OF THE INVENTION

This invention relates to walk-behind agricultural working machines for drawing auxiliary working devices, such as ridgers or ridge forming devices.

BACKGROUND OF THE INVENTION

Among the conventionally-known walk-behind agricultural working machines are one (disclosed, for example, in Japanese Patent Laid-open Publication No. 2001-238504 (hereinafter "patent document 1")) that includes, in its rear section, a guide arm for regulating the position of an auxiliary working device drawn by the agricultural working machine (hereinafter also called a "machine-drawn working device"), and one (disclosed, for example, in Japanese Patent Laid-open Publication No. HEI-10-225205 (hereinafter "patent document 2")) that includes, in its rear section, an elevator mechanism for vertically moving any one of various machine-drawn working device connected to the elevator mechanism.

FIG. 19A is a side view showing principal components in a rear section of the conventional walk-behind agricultural working machine disclosed in the above-mentioned patent document 1 and auxiliary working device drawn by the working machine. Frame plate 202 is secured to a rear portion of a power transmission case 201 provided on the walk-behind agricultural working machine which is constructed as a tiller or cultivator, and a machine-drawn working device 204, which is constructed as a ridger or ridge forming device 204, is connected to a rear end portion of a drawing bar 203 pivotally connected to the frame plate 202 via a horizontal lower pivot shaft 202a. Guide arm 205 is vertically pivotably connected to the frame plate 202, and has an upward movement restricting portion 206 for regulating the position of a lower pin shaft 207 provided on the drawing bar 203. The guide arm 205 also has an upward/downward movement restricting portion 206a for regulating the position of an upper pin shaft 207 provided on the drawing bar 203. The drawing bar 203 has a holder 208 provided on its rear end portion for insertion therethrough a vertical stay 311, and it connects the ridger 204 to the working machine by fixing the stay 311 to the holder 208 by means of a locking member 312. Further, an operating angle of a middle blade 215 of the ridger 204 can be changed about a pivot point 314 by the human operator turning a knob 313, and a vertical position (height) of the tail wheel 217 can be changed by the human operator turning an adjusting handle 316.

FIG. 19B is a side view of the agricultural working machine disclosed in patent document 1. In the disclosed agricultural working machine 414, the ridger 204 can be shifted to a raised inoperative position as shown by causing the drawing bar 203 with the stay 311 to pivot upwardly about the lower shaft 202a and locking the drawing bar 203 and stay 311 in the raised position via the guide arm 205 of FIG. 19A. Reference numeral 315 in FIG. 19B represents an operating handle of the agricultural working machine 414.

FIG. 20 is another side view of the walk-behind agricultural working machine 414, which shows how it operates, i.e. how the working machine 414 forms hard earth 213 into cultivated soil 214 via cultivating claws 212 and forming ridges via the ridger 204 while traveling on wheels (only one of which is shown) 211.

In the illustrated example of FIG. 19A, when the pin shafts 207 are restricted in position by the movement restricting portions 206 and 206a formed on the guide arm 205, the traveling wheels 211 are prevented from moving downward relative to the ridger 204. Thus, prior to initiation of ridging operations when the lower surface of the ridger 204 contacts the soil, the driving traveling wheels 211 would float above the soil, so that no driving force can be obtained from the traveling wheels 211. If the human operator depresses the operating handle of the agricultural working machine 414 device to force the traveling wheels 211 into contact with the soil, then the necessary driving force can be obtained from the traveling wheels 211, and therefore desired operations can be carried out as illustrated in FIG. 20; however, in this case, loads on the operator would increase.

When the height of ridges to be formed by the ridger 204 is to be adjusted in the agricultural working machine of FIGS. 19A and 19B and 20, the vertical position of the ridger 204 can be changed, for example, by 1̂ vertically moving the stay 311 relative to the holder 208 and then fixing the stay 311 by means of the locking member 312, 2̂ turning the knob 313 to change the angle of the middle blade 215 of the ridger 204 and/or 3̂ tuning the adjusting handle 316 to vertically move the tail wheel 217 of the ridger 204. However, these three approaches 1̂–3̂ can only adjust the vertical position of the ridger 204 with respect to the drawing bar 203; they can never adjust the vertical position of the ridger 204 with respect to the power transmission case 201, because the drawing bar 203 and ridger 204 pivot about the lower shaft 202a relative to the power transmission case 201.

Furthermore, because upward movement of the ridger 204 is restricted by cooperation between the movement restricting portions 206 and 206A and pin shafts 207 via the drawing bar 203, the ridger 204 is not allowed to move higher than a predetermined height with respect to the power transmission case 201. Namely, because the ridger 204 can freely pivot while it is below a predetermined height, it is difficult to form ridges with a uniform height.

In the agricultural working machine 414 shown in FIGS. 19A and 19B, the ridger 204 can be raised, via the drawing bar 203, stay 311, etc., to a higher inoperative position farther away from the soil, if the lengths of the drawing bar 203 and stay 311 are increased. Capability to raise the ridger 204 to a higher inoperative position like this is advantageous in that the ridger 204 is prevented from contacting the soil when the agricultural working machine 414 makes a turn during the course of the agricultural work or when the machine 414 just travels for a certain purpose other than the agricultural work. Further, the capability can prevent the ridger 204 from contacting the soil even when the traveling wheels of the agricultural working machine 414 have sunk down into soft soil. In addition, the capability can prevent the ridger 204 from interfering with steps of the human operator walking while manipulating the operating handle 315. However, the increased lengths of the drawing bar 203 and stay 311 would increase the overall weight of the agricultural working machine 414, thereby degrading the maneuverability and operability. Further, when the ridger 204 is lowered to its operative position for ridging, it gets very close to the legs and feet of the human operator, which results in degraded operability.

FIG. 21 is a side view of the walk-behind agricultural working machine 231 disclosed in the above-mentioned patent document 2, which particularly shows a seeding device 232 connected as a machine-drawn working device to a rear section of the working machine 231 via the elevator mechanism 242 so that the seeding device 232 can be vertically moved as desired. Reference numeral 234 represents a rotary device having rotary claws 235, and 236 one of traveling wheels attached to an axle 237.

FIG. 22 is a side view of the elevator mechanism 242 of the walk-behind agricultural working machine 231, which particularly shows that a speed change guide member 241 is attached to a rear portion of a power transmission case and the elevator mechanism 242 is attached to the speed change guide member 241. The elevator mechanism 242 includes a link support member 244 connected to the speed change guide member 241, upper and lower links 245 and 246 having respective one ends pivotably connected to the link support member 244, and a body-side hitch (i.e., connection section) 247 pivotably connected to the respective other ends of the upper and lower links 245 and 246. The seeding device 232 is secured to the body-side hitch 247. The upper link 245 has a slide pin 251 provided on its middle portion. Lower limit position of the body-side hitch 247 can be controlled by placing the slide pin 251 in engagement with a downward-movement restricting recess 252, while an upper limit position of the hitch 247 can be controlled by placing the slide pin 251 in engagement with an upward-movement restricting recess 253. Reference numeral 254 represents a pivot pin shaft pivotably supporting an end portion of the upper link 245 adjacent to the link support member 244, and 255 represents a coupling pivot shaft pivotably supporting an end portion of the lower link 246 adjacent to the link support member 244. Further, one-dot-dash lines in the figure are explanatory of a manner in which the lower limit position of the body-side hitch 247 is controlled by the downward-movement restricting recess 252, while solid lines are explanatory of a manner in which the upper limit position of the body-side hitch 247 is controlled by the upward-movement restricting recess 253.

When the seeding device 232 is lowered by the elevator mechanism 242 to a position for performing desired operations as illustrated in FIG. 21, the upper and lower links 245 and 246 slant rearwardly and downwardly as illustrated in FIG. 22. If the walk-behind agricultural working machine 231 is moved forward with the upper and lower links 245 and 246 slanting rearwardly and downwardly, a traction force T1 is produced in a forward and upward direction along the length of the upper and lower links 245 and 246 as illustrated in FIG. 22. Therefore, when the seeding device 232 is being drawn by the agricultural working machine 231, a vertically-upward component force T2 of the traction force T1 would make it difficult to keep the seeding device 232 at an appropriate vertical position.

For example, when the vertical position of the seeding device 232 is to be adjusted with the slide pin 251 engaging with the downward-movement restricting recess 252, the human operator vertically moves the operating handle to incline both of the agricultural working machine 231 and seeding device 232 in a forward or rearward direction, and thus loads on the human operator would increase. Furthermore, keeping the seeding device at a constant height would require considerable skills and experiences on the part of the human operator.

Further, as the upper and lower links 245 and 246 are caused to pivot upward in FIG. 22, the lower link 246 comes into abutment against the pivot pin shaft 254 supporting the upper link 245. Namely, because the upper and lower links 245 and 246 are coupled to the link support member 244 via the coupling pivot shaft 255, pivotable ranges of the upper and lower links 245 and 246 are considerably limited, which would limit the height of the seeding device 222 raised to its inoperative position (i.e., raised height of the seeding device 232).

SUMMARY OF THE INVENTION

In view of the foregoing prior art problems, it is an object of the present invention to provide an improved walk-behind agricultural working machine which allows a machine-drawn working device to be kept at an appropriate vertical position (e.g., appropriate sunk-down depth of a ridger in soil) so as to readily achieve a stabilized working depth and thereby reduce loads on a human operator.

It is another object of the present invention to provide an improved walk-behind agricultural working machine which permits appropriate adjustment of a sunk-down depth of a machine-drawn working device in soil without requiring skills and experiences of a human operator, thereby reducing loads on the human operator and achieving enhanced operability.

It is still another object of the present invention to provide an improved walk-behind agricultural working machine which can secure a sufficient raised height of a machine-drawn working device in an inoperative position, to thereby achieve enhanced maneuverability, operability and workability of the agricultural working machine.

According to the present invention, there is provided a walk-behind agricultural working machine, which comprises: an axle for a traveling wheel secured to a rear section of a machine body; a cultivator device mounted in front of the axle; and a connection mechanism provided on the rear section behind the axle, a working device being connectable, as an attachment of the agricultural working machine, to the rear section of the machine body via the connection mechanism. The connection mechanism includes upper and lower links that are operatively pivotably connected at respective one ends thereof to the rear section of the machine body and connected at the respective other ends thereof to the working device. Thus, when the working device connected to the machine body and the traveling wheel are both in a position contacting soil prior to initiation of desired agricultural work, the upper and lower links are inclined in such a manner that end portions of the upper and lower links adjacent to the working device are located higher than other end portions of the upper and lower links adjacent to the machine body.

As the agricultural working machine thus arranged initiates agricultural work by drawing the working device held in contact with the soil, a forward and downward traction force can be produced in the upper and lower links whose respective one end portions adjacent to the working device are located higher than the other end portions adjacent to the machine body, so that the working device can gradually sink down into the soil due to a vertically-downward component of the produced traction force. Further, when the working device has further sunk down into the soil to the extent that the upper and lower links assume a substantially horizontal position, an appropriate sunk-down depth of the working device can be maintained because the vertically-downward component of the traction force no longer acts on the working device.

Such inventive arrangements can eliminate the need for the human operator to depress the operating handle in order to cause the working device to sink down into the soil and the need to adjust the handle-depressing force through experiences, guess, etc., thereby significantly facilitating the operations by the working device and reducing loads on the human operator. Further, the inventive arrangements can constantly keep the working device at an appropriate sunk-down position and thereby achieve a stabilized working depth.

In one embodiment of the present invention, the connection mechanism includes a vertically-moving unit for permitting vertical movement of a predetermined portion of the moving unit adjacent to the working device with respect to the machine body, and a lower-limit-position control unit for controlling a lower limit position of the predetermined portion of the vertically-moving unit adjacent to the working device, and a position of the working device sunk down in the soil (i.e., sunk-down depth or position of the working device) during the agricultural work is restricted by the lower-limit-position control unit controlling the lower limit position of the predetermined portion.

With the lower-limit-position control unit provided in the connection mechanism, the present invention can appropriately restrict the sunk-down depth of the working device in the soil and thereby form ridges or the like of a uniform height.

Whereas the conventionally-known walk-behind agricultural working machines where sufficient skills and experiences of a human operator are required to set a desired sunk-down depth of a machine-drawn working device, the present invention allows a desired sunk-down depth of the working device to be readily set by means of the lower-limit-position control unit, thereby eliminating the need for skills and experiences of the human operator and achieving enhanced workability of the working device. Also, the present invention can eliminate the need for hard labor of the human operator, such as depression of the working device to a desired sunk-down depth, thereby achieving not only enhanced operability of the agricultural working machine but also reduced loads on the human operator.

In one embodiment of the present invention, the vertically-moving unit includes the upper and lower links. The lower-limit-position control unit also includes: a first link connected at one end to the upper or lower link, a second link pivotably connected to another end of the first link, and an engagement member provided on the second link for engagement with the machine body so that a height of the end portion of the upper link or lower link adjacent to the working device can be selectively changed via the second link and first link.

With the arrangements that the engagement member, provided in the sunk-down position adjustment unit, is engageable with any desired one of a plurality of different vertical positions on the machine body and that the upper and lower links are provided in parallel relation to each other, the lower limit position of the working device can be changed by just vertically moving the working device via the upper and lower links without the posture of the working device being changed so much. As a result, the present invention can significantly enhance the workability of the working device at each selected lower limit position of the working device.

Further, because the lower limit position of the working device can be adjusted by just changing the engaged position of the engagement member, the present invention allows the sunk-down position of the working device to be adjusted with ease. Thus, with the present invention, it is possible to readily set an appropriate sunk-down position of the working device depending on the type of the working device to be connected to and drawn by the machine, soil conditions, crop to be raised, etc.

In one embodiment of the present invention, the connection mechanism further includes: a base member connected to the machine body; an arm vertically pivotably connected to the base member, the upper and lower links being vertically pivotably connected at the respective one ends to upper and lower end portions of the arm; a connection member connected to the respective other ends of the upper and lower links for connecting the working device to the machine body of the agricultural working machine; an engaging member provided on the upper link; and a window section formed in the base member and receiving part of the engaging member for movement along an edge of the window section. The working device is vertically movable by the arm being vertically pivoted with the engaging member guided along the edge of the window section.

In the present invention, the upper and lower links pivotably connected to the base member are vertically pivotable together with the arm, the end portion of the working device adjacent to the connection member can be shifted to a higher position than in the case where only the upper and lower links are pivoted to move the end portion upwardly. As a result, the present invention can secure a sufficient height of the working device in the raised inoperative position.

Further, the present invention can reduce the overall weight of the agricultural working machine by eliminating the need for increasing the lengths of the upper and lower links, thereby achieving enhanced maneuverability and operability of the machine. Because the upper and lower links are shorter in length than the conventional counterparts, the working device can be positioned closer to the body of the machine, which can leave a sufficient space in front of the legs and feet of the human operator even when the working device is in its lowered operative position. The sufficient space can lead to enhanced workability of the agricultural working machine. Furthermore, with the upwardly-pivotable arm, the upper and lower links can be pivoted over a greater range than in the case where no such pivotable arm is provided, with the result that the present invention allows the working device to be raised to a higher inoperative position farther away from the soil.

BRIEF DESCRIPTION OF THE DRAWINGS

Certain preferred embodiments of the present invention will hereinafter be described in detail, by way of example only, with reference to the accompanying drawings, in which:

FIGS. 7A and 7B are views explanatory of behavior of the connection mechanism;

FIGS. 12A–12C are views further explanatory of the behavior of the connection mechanism;

FIG. 15A–15D are views further explanatory of the connection mechanism;

FIGS. 16A–16C are views further explanatory of the behavior of the connection mechanism;

FIG. 22 is an enlarged side view of an elevator mechanism employed in the agricultural working machine of FIG. 21.

DETAILED DESCRIPTION OF THE PREFERRED EMBODIMENTS

Figure 1:
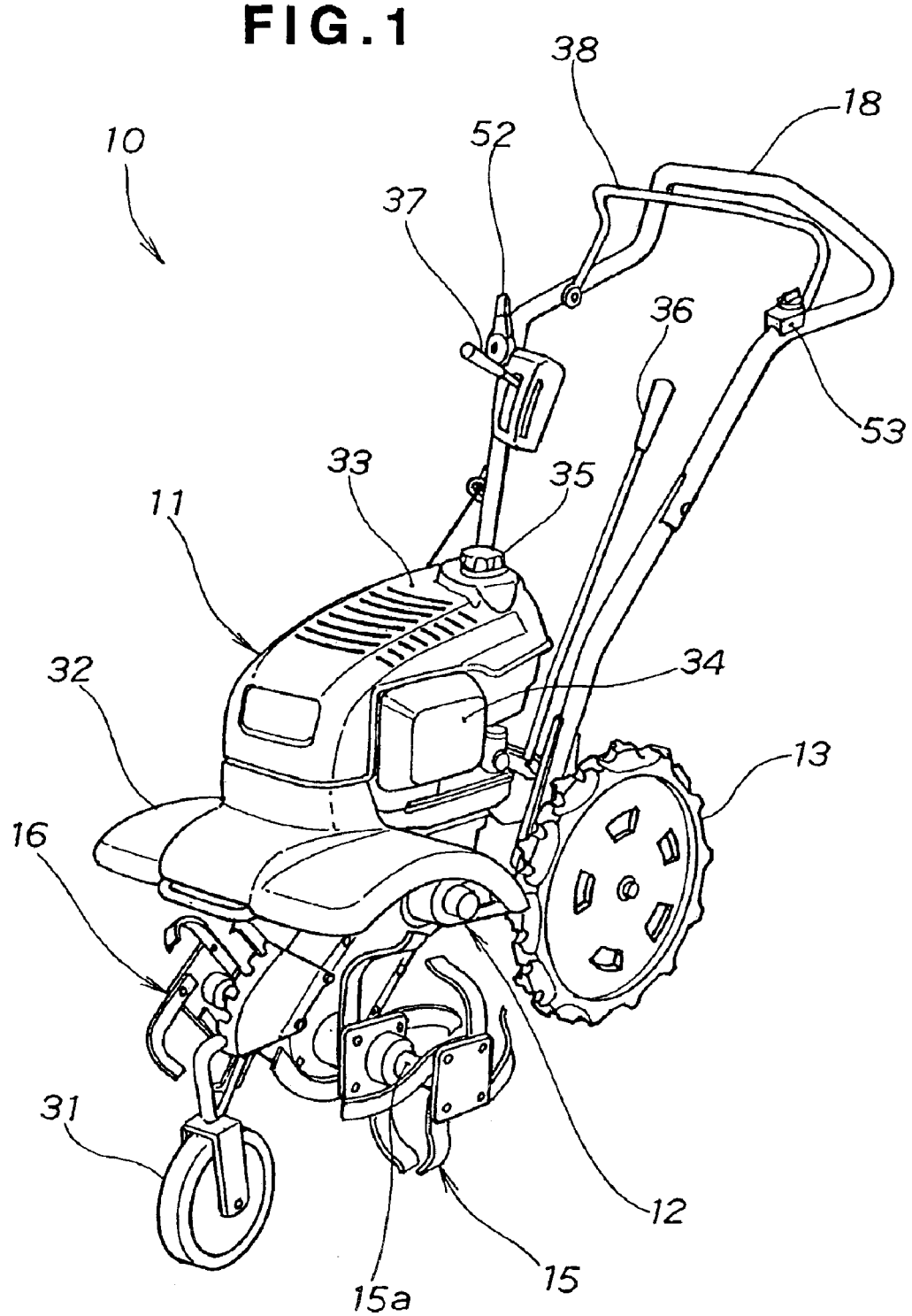
FIG. 1 is a perspective view of a walk-behind agricultural working machine in accordance with an embodiment of the present invention.

FIG. 1 is a perspective view of a walk-behind agricultural working machine 10 in accordance with an embodiment of the present invention. The agricultural working machine 10 includes left and right traveling wheels 13 and 14 (only the left traveling wheel 13 is shown in the figure), left and right cultivator devices 15 and 16 disposed in front of the left and right traveling wheels 13 and 14, and an engine 11 for driving the traveling wheels 13 and 14 and cultivator devices 15 and 16 via a power transmission unit 12 forming a part of the body of the machine 10. Auxiliary working device (machine-drawn working device), such as a ridger, is connected to a rear portion of the power transmission unit 12. With such arrangements, the agricultural working machine 10 of the invention can, for example, form ridges by means of the ridger while cultivating a field by means of the cultivator devices 15 and 16.

Figure 2:
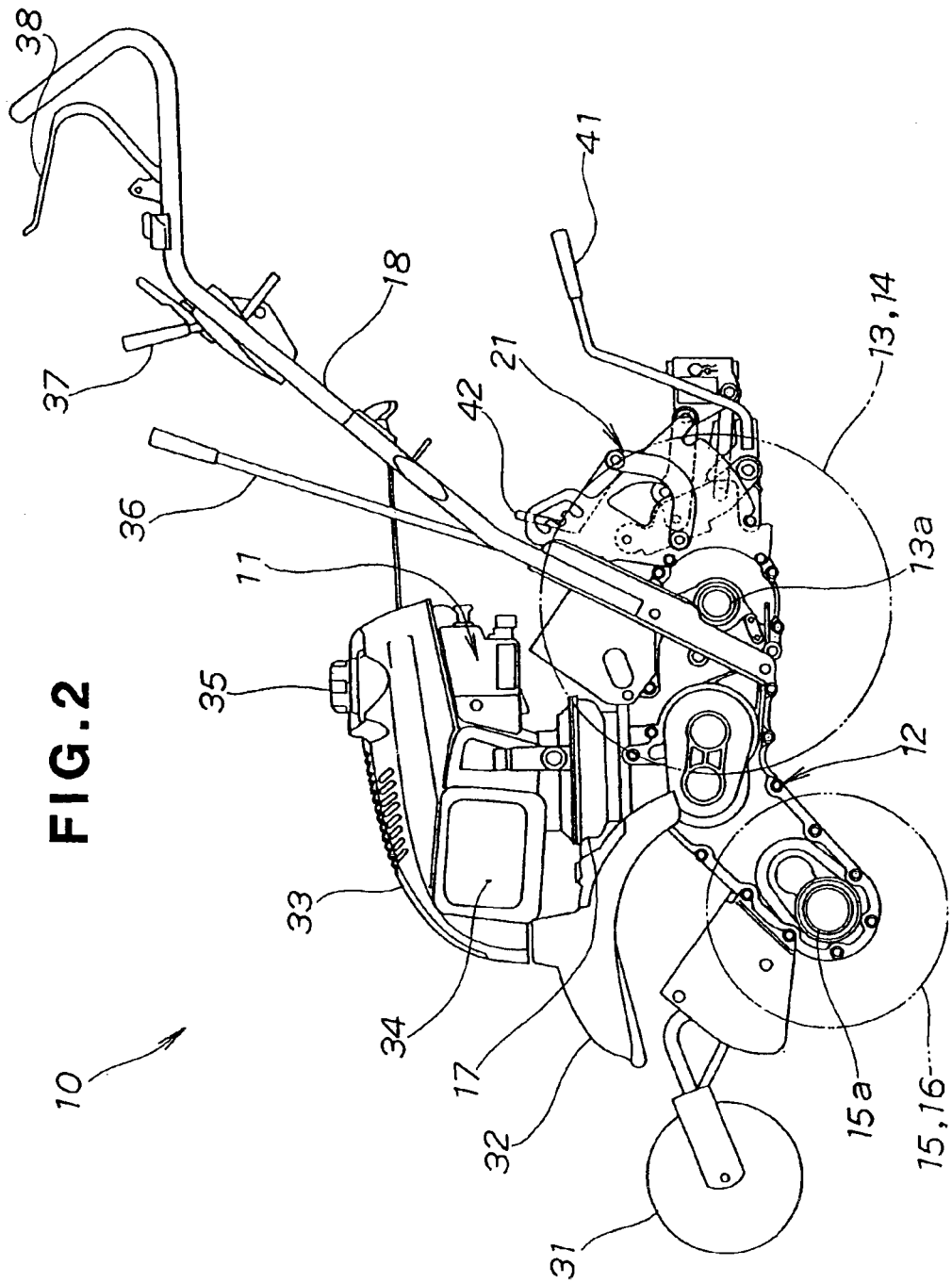
FIG. 2 is a side view of the agricultural working machine of the present invention.

FIG. 2 is a side view of the agricultural working machine 10, which particularly shows the engine 11 disposed within an upper portion of the machine body, the power transmission unit 12 disposed below the engine 11 with a clutch-containing case (clutch case) 17 interposed there between, the cultivator devices 15 and 16 rotatably connected to a front portion of the power transmission unit 12 via left and right cultivating shafts 15a and 16a (only the left cultivating shaft 15a is shown in the figure) and the traveling wheels 13 and 14 rotatably mounted to a rear portion of the power transmission unit 12 via left and right axles 13a and 14a (only the left axle 13a is shown in the figure). The agricultural working machine 10 also includes an operating handle 18 extending obliquely in a rearward and upward direction from a rear end portion of the power transmission unit 12, and a connection mechanism 21 secured to the rear end of the transmission unit 12.

The agricultural working machine 10 also includes an auxiliary traveling wheel 31 secured to a front end portion of the power transmission unit 12 in such a manner that the wheel 13 is vertically adjustable in position, a fender 32 covering upper portions of the power transmission unit 12 and cultivator devices 15 and 16, an engine cover 33 covering an upper portion of the engine 11, an air cleaner 34, and a filler cap 35 for openably closing a fuel tank. The agricultural working machine 10 further includes a transmission shift lever 36, a differential lock (diff lock) lever 37, a clutch lever 38, a shift lever 41 operable for raising the machine-drawn working device to an inoperative position, and a sunk-down position adjustment lever 42 operable for adjusting a position of the a working device sunk down in the soil (i.e., sunk-down position of the machine-drawn working device).

Figure 3:
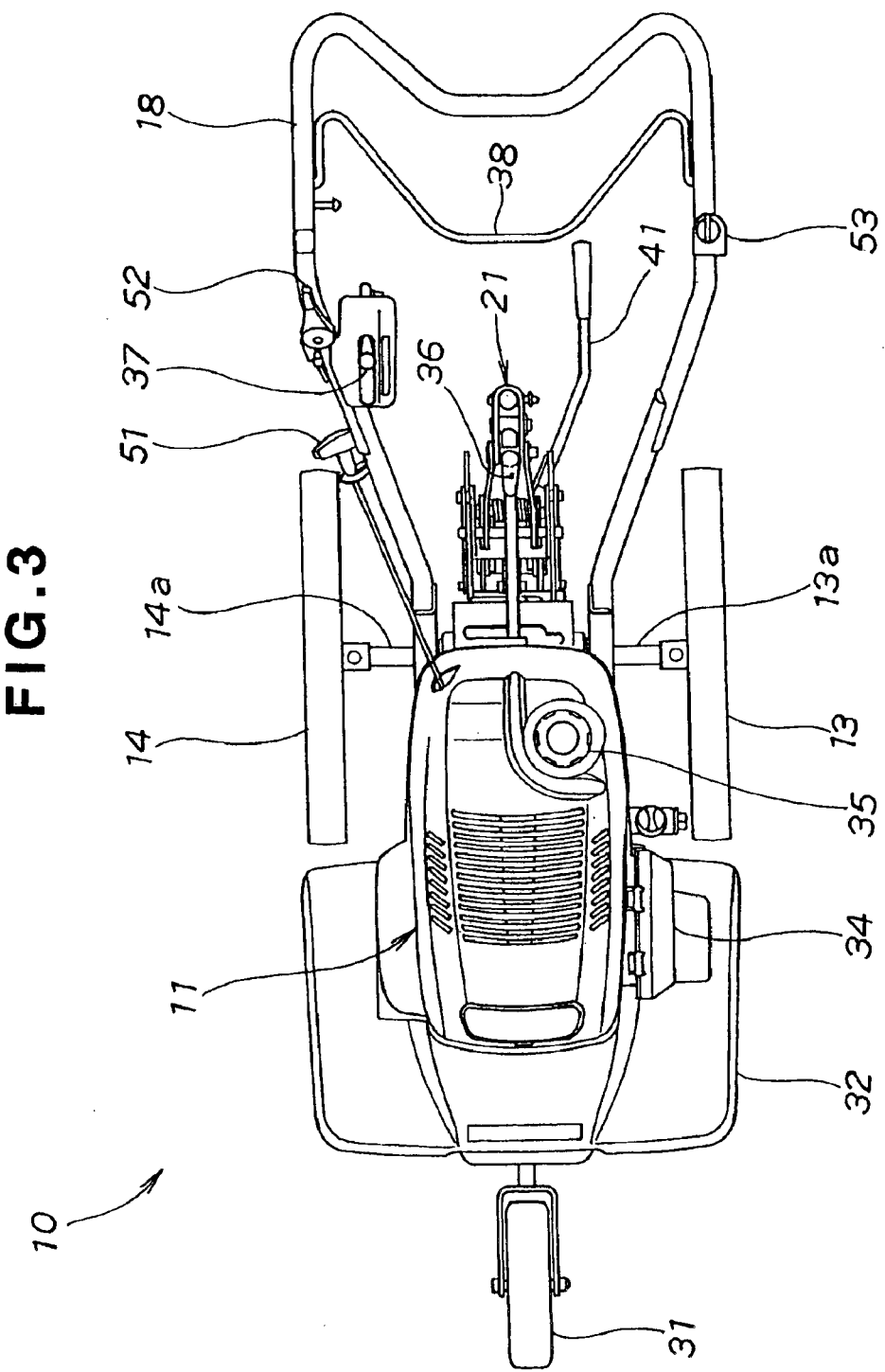
FIG. 3 is a top plan view of the agricultural working machine of the present invention.

FIG. 3 is a top plan view of the agricultural working machine 10. As shown, the agricultural working machine 10 further includes a recoil starter knob 51 for activating the engine 11 and a throttle lever 52 for adjusting output of the engine 11, and these knob 51 and lever 52 and the above-mentioned diff lock lever 37 are positioned on a right front portion of the operating handle 18. The agricultural working machine 10 further includes an engine switch 53 provided on a left rear portion of the handle 18 for deactivating the engine 11, and a clutch lever 38 extending horizontally between opposed rear regions of the handle 18. As further shown in the figure, the transmission shift lever 36 extends rearwardly (i.e., toward the human operator) from a middle region of the rear end of the power transmission unit 12 (FIG. 1), and the shift lever 41 extends rearwardly from a rear left portion of the connection mechanism 21.

Figure 4:
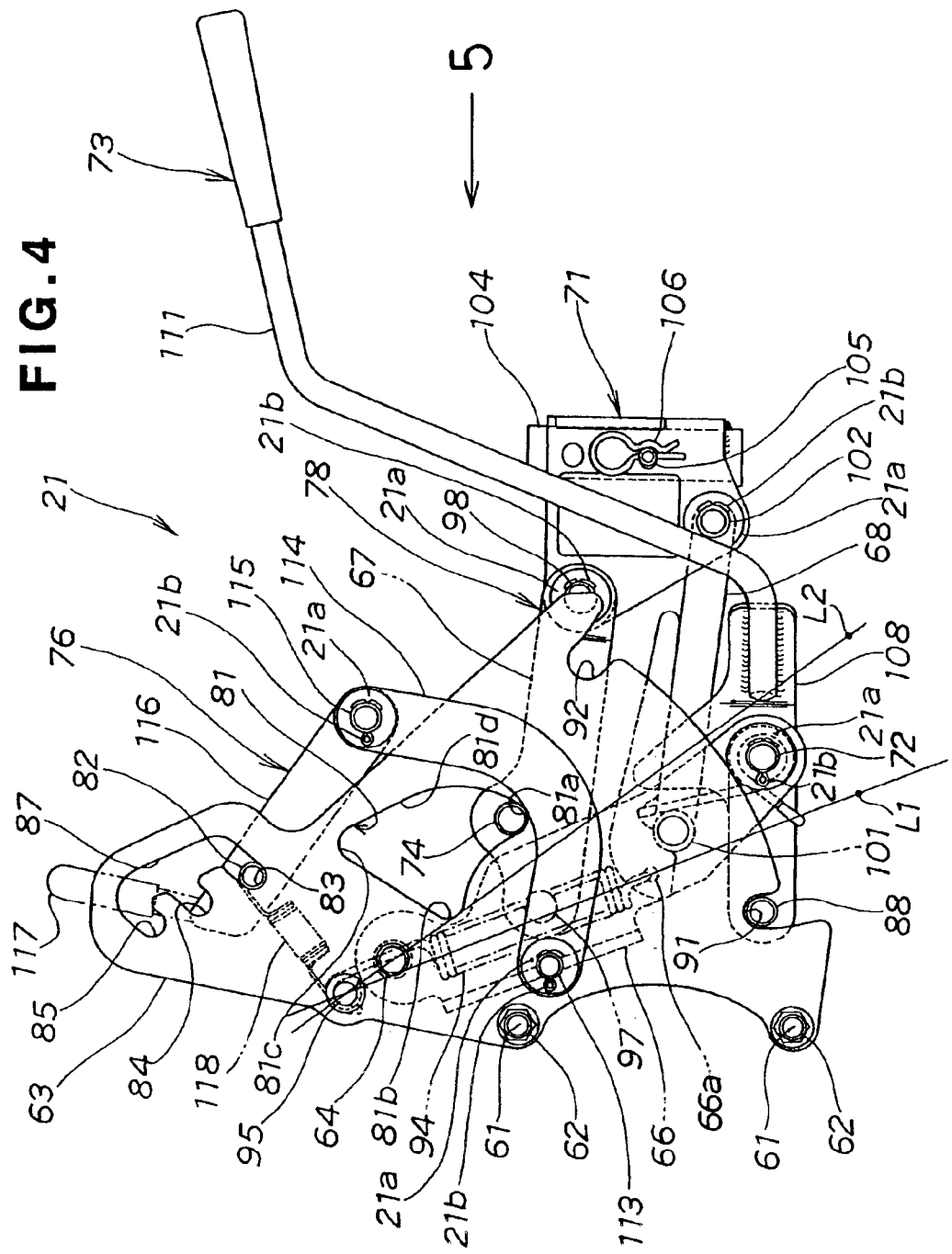
FIG. 4 is a side view of a connection mechanism employed in the agricultural working machine of the present invention.

FIG. 4 is a side view of the connection mechanism 21 employed in the agricultural working machine 10. The connection mechanism 21 includes left and right base plates 63 (only one of which is shown in the figure) are secured via bolts 61 and nuts 62 to the rear end of the power transmission unit 12, a base arm 66 disposed between the left and right base plates 63 and pivotable about a pivot shaft 64, upper and lower links 67 and 68 connected to the base arm 62 for vertical pivotal movement, a connection member 71 pivotably connected to the upper and lower links 67 and 68, and a shift lever 41 pivotably connected via a pivot shaft 72 to the distal end of the base arm 66. The connection mechanism 21 also includes a sunk-down position adjustment unit (or lower-limit-position control unit) 76 for adjusting, via the upper and lower links 67 and 68 and connection member 71, the sunk-down position of the auxiliary working device coupled to the connection member 71, by vertical movement of an engaging member 74 in the form of a laterally-projecting pin, disposed on a longitudinally middle portion of the upper link 67. The upper and lower links 67 and 68 constitute a connection link mechanism 78.

The one base plate 63 has a first window section 81 formed in its substantial central portion so that the engaging member or laterally-projecting pin 74, extending from between the base plates 63, is received in the first window section 81; for example, the pin 74 projects through the window section 81 laterally outwardly beyond the side surface of the base plate 63. The base plate 63 also has a second window section 87 formed in its upper end portion and having upper recesses 83–85 in any one which an engagement pin 82 is selectively engageable, and lower recesses 91 and 92 formed in its lower end portion so that a laterally-projecting pin 88 provided at a distal end of the shift lever 41 is selectively engageable in any one of the recesses 91 and 92.

The first window section 81 is triangular in shape, which has a first, second and third corners 81a, 81b and 81c and a curved upper edge 81d between the first and third corners 81a and 81c. The first corner 81a functions as a stopper for regulating the downward pivoted position of the upper link 67, by engaging with the laterally-projecting pin 74. The second corner 81b functions as a stopper for regulating the upward pivoted position of the upper link 67, by engaging with the laterally-projecting pin 74 with the pivotal movement of the base arm 66 prevented by the shift lever 41. Further, the third corner 81c functions as a stopper for regulating counterclockwise pivotal movement of the upper link 67, by engaging with the laterally-projecting pin 74 when the base arm 66 and upper link 67 are both pivoted upward. Further, the curved upper edge 81d serves to guide the laterally-projecting pin 74 as the base arm 66 vertically pivots about the pivot shaft 64. The curved upper edge 81d is generally curved to gradually get closer to the pivot shaft 64 in a direction from its lower end to its upper end.

The base arm 66 is an element vertically pivotable about the pivot shaft 64 and having an upper link pivot shaft 97, lower link pivot shaft 101 and shift lever pivot shaft 72 provided thereon. In the figure, the base arm 66 is in its extreme downward pivoted position with the laterally-projecting pin 88 of the shift lever 41 engaged in the lower recess 91 of the base plate 63.

Tension coil spring 94 assists upward pivotal movement of the base arm 66 about the pivot shaft 64. The tension coil spring 94 has one end engaged by a support pin 95 provided on the base plate 63 and the other end engaged in a hole 66a formed in the base arm 66. The tension coil spring 94 can reduce a force to be applied to the shift lever 41 by the human operator. Namely, in operation, the tension coil spring 94 imparts a pulling force to cause the machine-drawn working device to sink down into the soil, until the laterally-projecting pin 74 of the upper link 67 abuts against the first corner 81a of the first window section 81. But, once a centerline L1 of the tension coil spring 94 gets higher in position than a straight line L2 passing through the respective centers of the pivot shaft 64 of the base arm 66 and the support pin 95 provided on the base plate 63, the tension coil spring 94 imparts a pulling force to cause the base arm 66 to pivot upwardly.

The pins 97 and 98 couple the opposite ends of the upper link 67 to the base arm 66 and connection member 71, and the pins 101 and 102 couple the opposite ends of the lower link 68 to the base arm 66 and connection member 71.

The upper and lower links 67 and 68 are parallel links having substantially the same effective operating length. In FIG. 4, the upper and lower links 67 and 68 are in respective extreme downward pivoted positions with the laterally-projecting pin 74 of the upper link 67 abutting against the lower edge of the first window section 81.

As further shown in FIG. 4, the connection member 71 has a rear cylindrical portion 104 for insertion therein a columnar member provided on the distal end of the auxiliary working device. Locking pin 105 is passed horizontally through the cylindrical portion 104 to prevent the columnar member of the auxiliary working device from dropping out of the cylindrical portion 104, and a pin 106 is passed vertically through an end portion of the locking pin 105 to prevent the locking pin 105 from slipping out of the cylindrical portion 104.

The shift lever 41 includes a distal end plate 108 connected to the base arm 66, a crank-shaped lever portion 111 extending from the distal end plate 108 obliquely in a rear and upward direction, and the laterally-projecting pin 88 selectively engageable in any one of the lower recesses 91 and 92.

The sunk-down position adjustment unit 76 includes a substantially L-shaped link 114 pivotably connected to the base plate 63 via a pivot shaft 113 for supporting a lower portion of the upper link 67, and an additional upper link 116 pivotably connected to the distal end of the L-shaped link 114 via a pivot shaft 115. The sunk-down position adjustment unit 76 also includes the engagement pin 82 provided on opposed side surfaces of the additional upper links 116, and an operating lever 117 extending upward from the distal end of the additional upper link 116. Tension coil spring 118 has one end secured to a spring support pin 95 of the base plate 63 and the other end secured to the engagement pin 82, which prevents the engagement pin 82 from being accidentally disengaged from any one of the upper recesses 83–85. Here, reference numeral 21 are presents a washer, and 21b split pins passed through end portions of the pins to prevent accidental slip-out of the pins.

Figure 5:
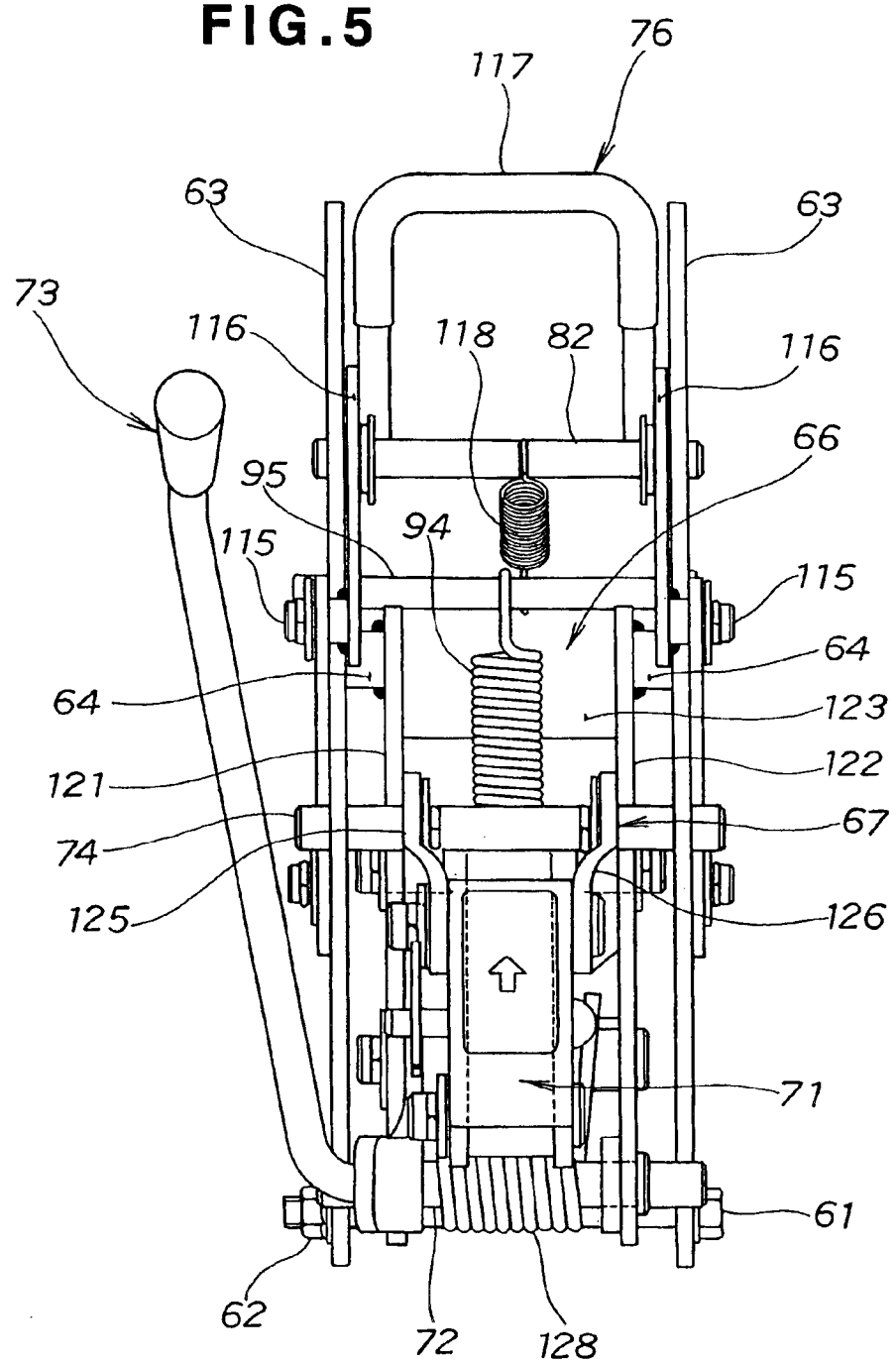
FIG. 5 is a view taken in a direction of arrow "5" of FIG. 4.

FIG. 5 is a view taken in a direction of arrow "5" of FIG. 4. As shown, the base arm 66 is an integrally-formed member, which includes left and right arm portions 121 and 122 and a connection plate 123 interconnecting the arm portions 121 and 122. Each of the left and right arm portions 121 and 122 has the corresponding pivot shaft 64 rotatably supported thereon. The upper link 67 includes left and right link members 125 and 126, and the laterally-projecting pin 74 horizontally extends between and through the link members 125 and 126. Helical torsion spring 128, mounted on the pivot shaft 72, normally urges the shift lever 41 in such a direction where a rear end portion of the lever 41 is resiliently pressed downward. The operating lever 117 of the sunk-down position adjustment unit 76 has a gate-like (inverted U) shape and is secured to the upper links 116 on opposite sides of the sunk-down position adjustment unit 76.

Figure 6:
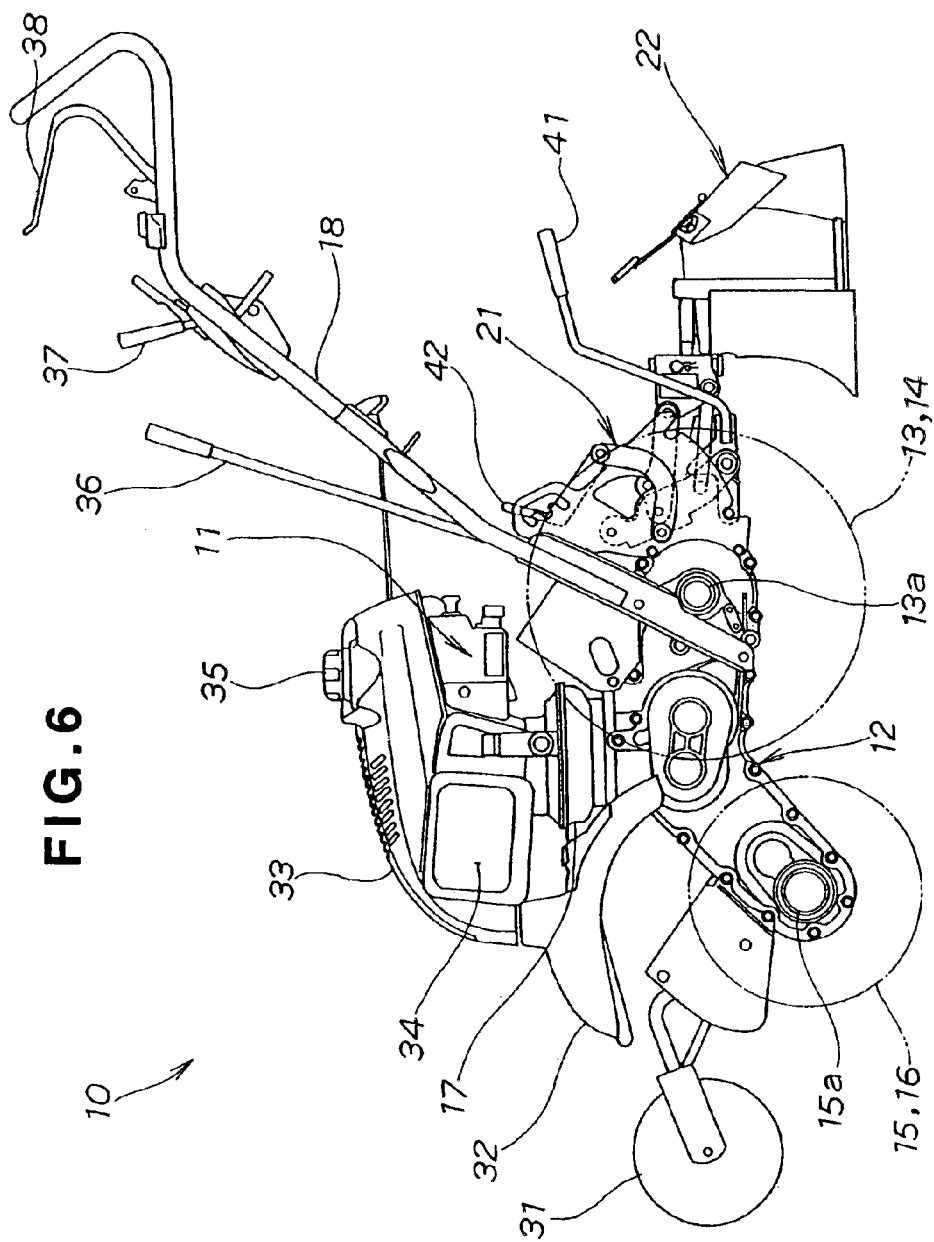
FIG. 6 is a side view of the agricultural working machine with a ridger connected as an auxiliary working device connected to the connection mechanism.

FIG. 6 is a side view of the agricultural working machine 10 with the auxiliary working device (ridger 22 in the illustrated example) connected to the connection mechanism 21. The ridger 22 is capable of forming both of flat and rounded ridges.

FIGS. 7A and 7B are views explanatory of behavior of the connection mechanism 21 employed in the inventive agricultural working machine 10, which particularly explain operation of the upper and lower links 67 and 68.

Specifically, FIG. 7A shows the upper and lower links 67 and 68 when the connection member 71 connected with the respective rear ends of the links 67 and 68 is in its lowermost position, i.e. when the laterally-projecting pin 74 of the upper link 67 is in abutting engagement with the lower edge of the first window section 81.

FIG. 7B shows the upper and lower links 67 and 68 in respective upwardly-pivoted positions where end portions of the links 67 and 68 adjacent to the connection member 71 are located higher than other end portions of the links 67 and 68 adjacent to the base arm 66 or machine body, i.e. where the coupling pin 98 at the rear end of the upper link 67 is located higher than the coupling pin 97 at the front end of the link 67 and the coupling pin 102 at the rear end of the lower link 68 is located higher than the coupling pin 101 at the front end of the link 68.

Figure 8:
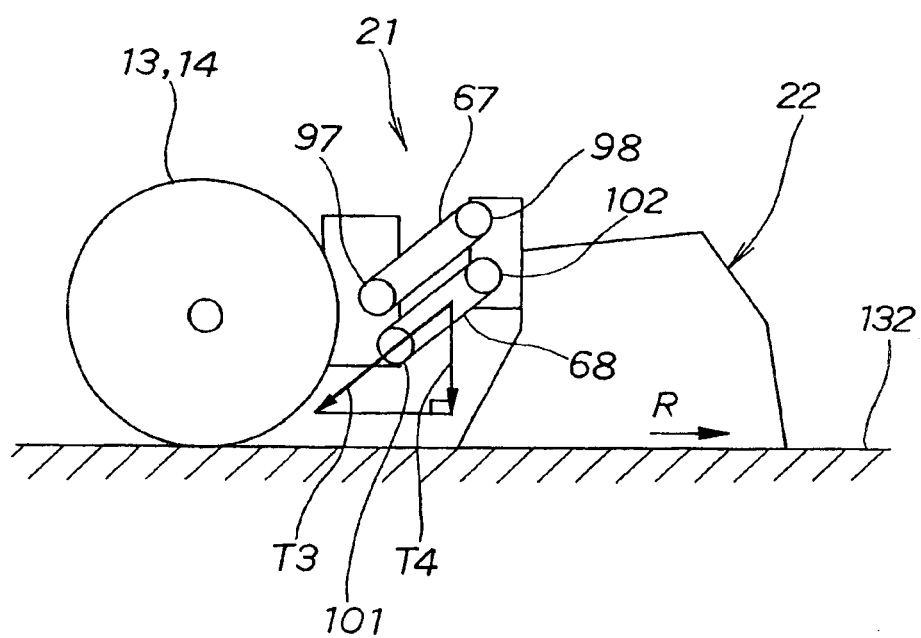
FIG. 8 is a view further explanatory of the behavior of the connection mechanism.

FIG. 8 is a view further explanatory of the behavior of the connection mechanism 21 employed in the inventive agricultural working machine 10, which particularly explains a depressing force acting on the auxiliary working device. In the illustrated example, the ridger 22 is in a lowered operative position ready for ridging operations, and the ridger 22 and the traveling wheels 13 and 14 contact the soil 132. In this state, the respective rear end portions of the upper and lower links 67 and 68 are located higher than the front end portions.

As the traveling wheels 13 and 14 are driven to advance the agricultural working machine 10 from the illustrated state of FIG. 8, a rearward traction-resisting force R is produced in the ridger 22 drawn forward by the working machine 10. Thus, a forward and downward traction force T3 is produced in the upper and lower links 67 and 68 along the length of the links 67 and 68, so that the ridger 22 gradually sinks down into the soil 132 due to its own weight and vertically-downward component T4 of the traction force T3.

FIGS. 9A–9D are views further explanatory of the behavior of the agricultural working machine 10 and ridger 22, which particularly shows a sequence of ridging operations performed by the working machine 10 and ridger 22.

Figure 9A:
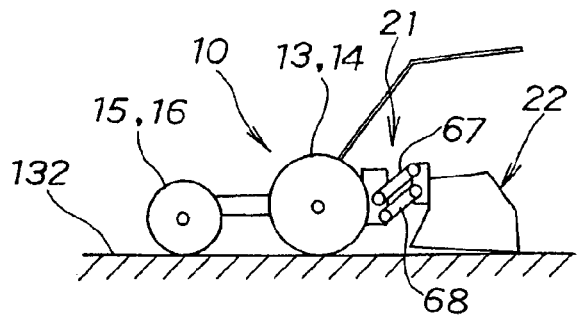
FIGS. 9A–9D are views further explanatory of the behavior of the agricultural working machine and ridger.

Specifically, FIG. 9A shows the agricultural working machine 10 and the ridger 22 in the lowered operative position before initiation of desired agricultural work, particularly ridging operations. Because the upper and lower links 67 and 68 in this state are freely pivotable in the vertical direction, the ridger 22 and the traveling wheels 13 and 14 both contact the soil 132, so that the rear end portions of the upper and lower links 67 and 68 adjacent to the ridger 22 are located higher than the front end portions adjacent to the traveling wheels 13 and 14.

Figure 9B:
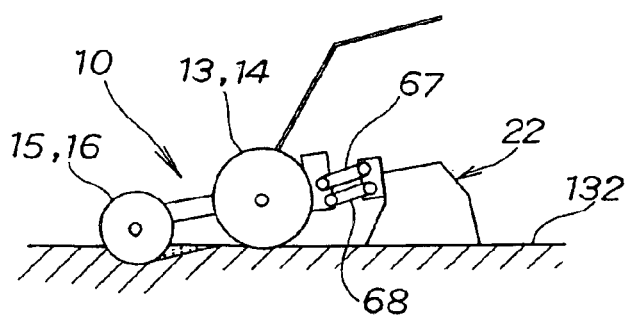

As the traveling wheels 13 and 14 are driven to advance the agricultural working machine 10, cultivating operations by the cultivator devices 15 and 16 are initiated as shown in FIG. 9B. Thus, the agricultural working machine 10 slants in a forward and downward direction, the upper and lower links 67 and 68 assume a smaller inclination than in the stationary state of FIG. 9A, and the ridger 22 keeps contacting the soil 132.

Figure 9C:
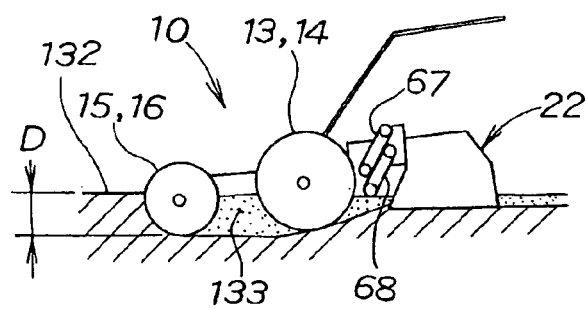

As the agricultural working machine 10 further advances, the cultivator devices 15 and 16 achieve a cultivating depth D as shown in FIG. 9C, so that the traveling wheels 13 and 14 and trailing ridger 22 enter and sink down into already-cultivated soil 133. At that time, the inclination of the upper and lower links 67 and 68 becomes much greater than in the state of FIG. 9B.

Figure 9D:
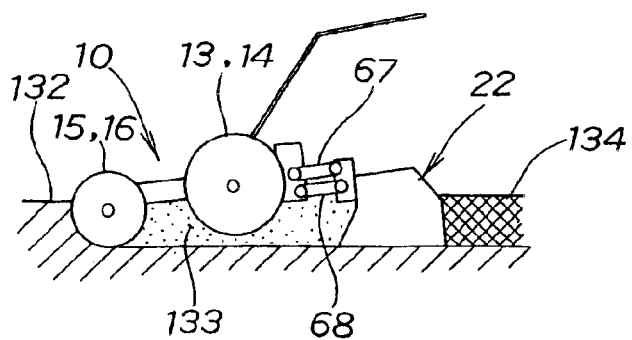

FIG. 9D shows the agricultural working machine 10 having advanced to the extent that the lower end of the ridger 22 reaches the bottom of the cultivated soil 133 and forms ridges 134 while keeping its lowered vertical position. At that time, the upper and lower links 67 and 68 are held in a substantially horizontal position or posture, and thus there is produced almost no force to depress the ridger 22.

Figure 10A:
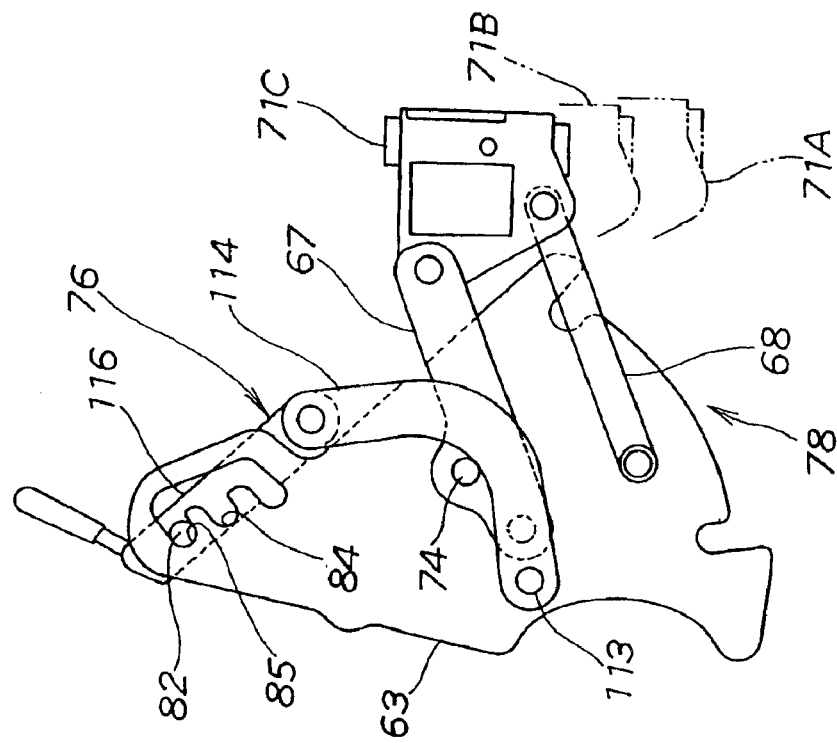
FIGS. 10A and 10B are views further explanatory of the behavior of the connection mechanism.
Figure 10B:
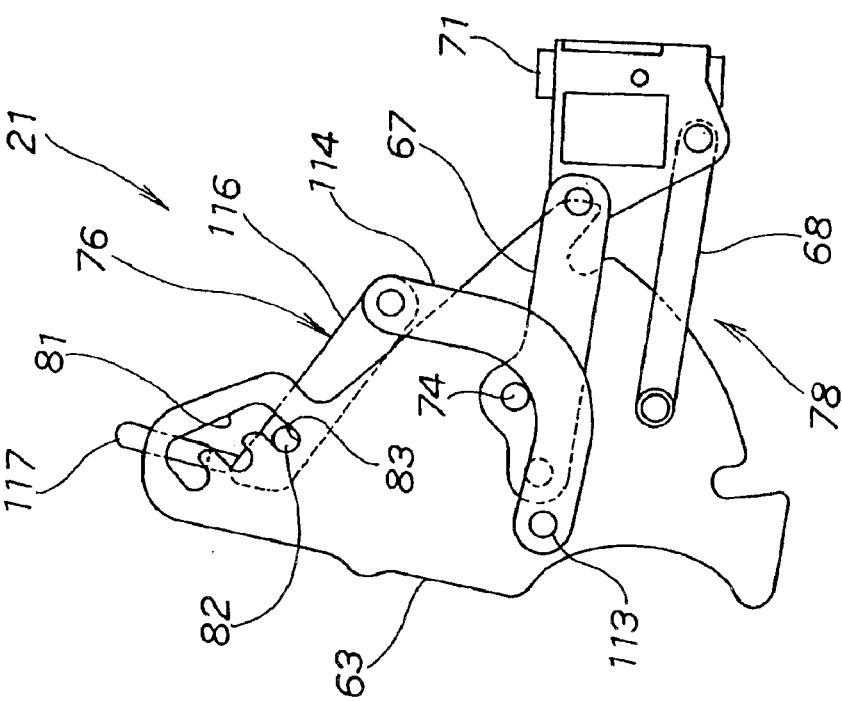

FIGS. 10A and 10B are views further explanatory of the behavior of the connection mechanism 21, which particularly explains operation of the sunk-down position adjustment unit (lower-limit-position control unit) 76.

Specifically, FIG. 10A shows the engagement pin 82 of the position adjustment unit 76 engaged in the lowermost upper recess 83 of the second window section 83. In this state, the upper and lower links 67 and 68 slightly slant rearwardly downward.

FIG. 10B shows the engagement pin 82 engaged in the uppermost recess 85 of the first window section 81. In this state, the L-shaped link 114 is in a position angularly displaced counterclockwise from its position of FIG. 10A, and thus the upper link 67 is also in a position angularly displaced counterclockwise from its position of FIG. 10A via the laterally-projecting pin 74. In the state of FIG. 10B, the upper and lower links 67 and 68 slightly slant rearwardly upward.

For convenience of explanation, the connection member 71 in the state of FIG. 10A will be denoted by 71A, and the connection member 71 in the state of FIG. B will be denoted by 71C for convenience of explanation. Further, the connection member 71 when the engagement pin 82 is engaged in the middle recess 84 will be denoted by 71B. Lower limit position of vertical movement of the connection member 71 changes downward as the connection member 71 changes its position in the order of "71C", "71B" and "71A".

Figure 11A:
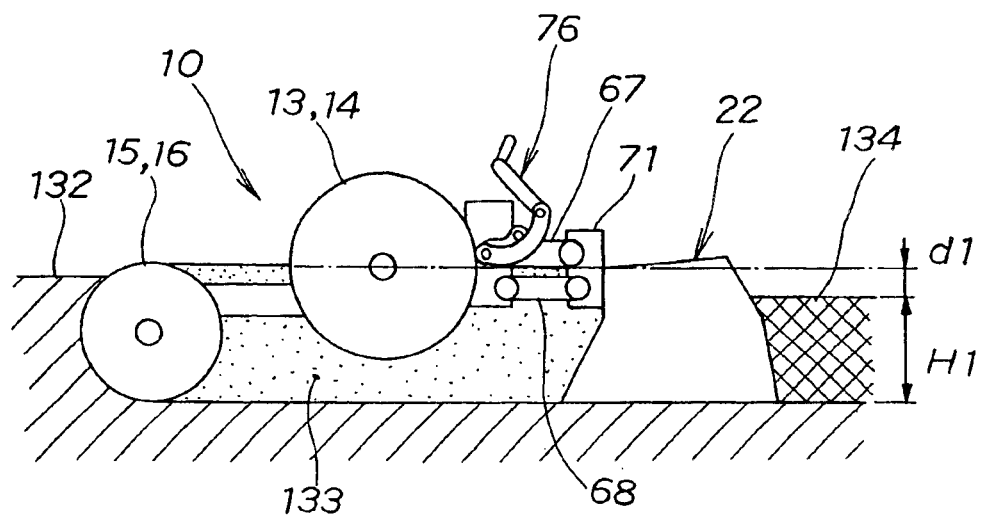
FIGS. 11A and 11B are views explanatory of operation of a sunk-down position adjustment unit provided in the connection mechanism.
Figure 11B:
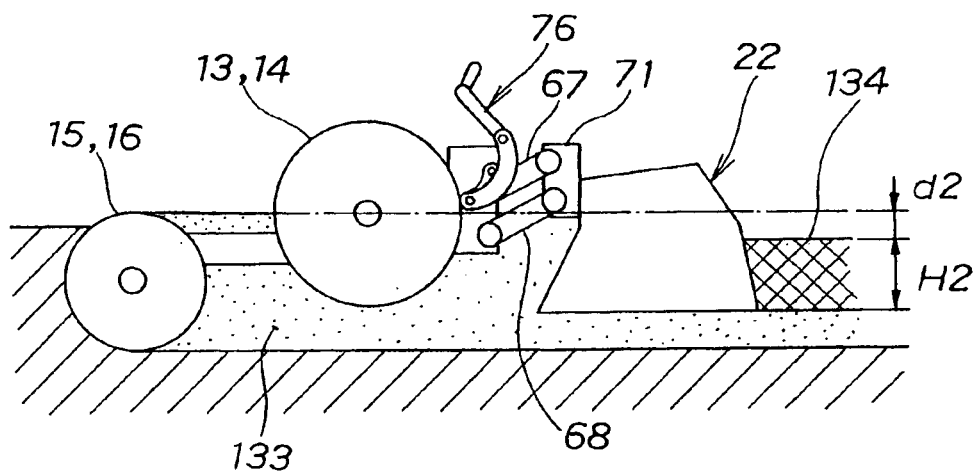

FIGS. 11A and 11B are views further explanatory of the operation of the sunk-down position adjustment unit 76, which particularly shows sunk-down position adjustment of the ridger 22.

Specifically, FIG. 11A shows that the ridger 22 can assume a greatest sunk-down amount when the sunk-down position adjustment unit 76 is adjusted to place the connection member 71 in the lowermost position. Height of a ridge 134 formed in this manner is represented by "H1". The lower end of the ridger 22 is located at the bottom of the already-cultivated soil 133. "d1" in the figure represents a level difference between the tops of the cultivated soil 133 and formed ridge 134, which corresponds to a soil compression amount of the formed ridge 134. At this stage, the upper and lower links 67 and 68 present a substantially parallel relation to each other.

FIG. 11B shows that the sunk-down amount of the ridger 22 can be reduced if the sunk-down position adjustment unit 76 is adjusted to place the connection member 71 higher than the position of FIG. 11A. At this stage, the upper and lower links 67 and 68 slant rearwardly upward, and the ridger 22 is located at a lower limit of a selected sunk-down depth due to a depressing force acting on the ridger 22. Because the ridger 22 is thus prevented from further sinking down into the soil, it is possible to form ridges 134 of a uniform height.

If the height of the ridge 134 formed in this manner is represented by "H2", H2<H1. "d2" in the figure represents a level difference between the tops of the cultivated soil 133 and ridge 134, which corresponds to a soil compression amount of the formed ridge 134. Here, "d2" is set to be almost equal to "d1", so as to provide necessary hardness of the ridge 134.

FIGS. 12A–12C are views further explanatory of the behavior of the connection mechanism 21, which particularly explains operation of the shift lever 41.

FIG. 12A shows the laterally-projecting pin 88 of the shift lever 41 engaged in the lower recess 91 of the base plate 63.

FIG. 12B shows the laterally-projecting pin 88 having been disengaged from the lower recess 91 by the human operator pivoting the lever portion 111 upwardly from the position of FIG. 12A and then pulling the lever portion 111 obliquely in the rearward and upward direction.

During that time, the base arm 66 pivots counterclockwise about the pivot shaft 64, and the upper and lower links 67 and 68 pivot counterclockwise together with the base arm 66 through abutting engagement, with the base arm 66, of a stopper (not shown) provided on the upper link 67.

FIG. 12C shows the laterally-projecting pin 88 having been displaced to a position close to the lower recess 92 from the position of FIG. 12B by the human operator further pulling the lever portion 111 in the rearward and upward direction and then pivoting the lever portion 111 downwardly so as to engage the laterally-projecting pin 88 in the lower recess 92. Namely, FIG. 12C shows the base arm 66 and upper and lower links 67 and 68 having pivoted upwardly from the positions of FIG. 12B.

Figure 13:
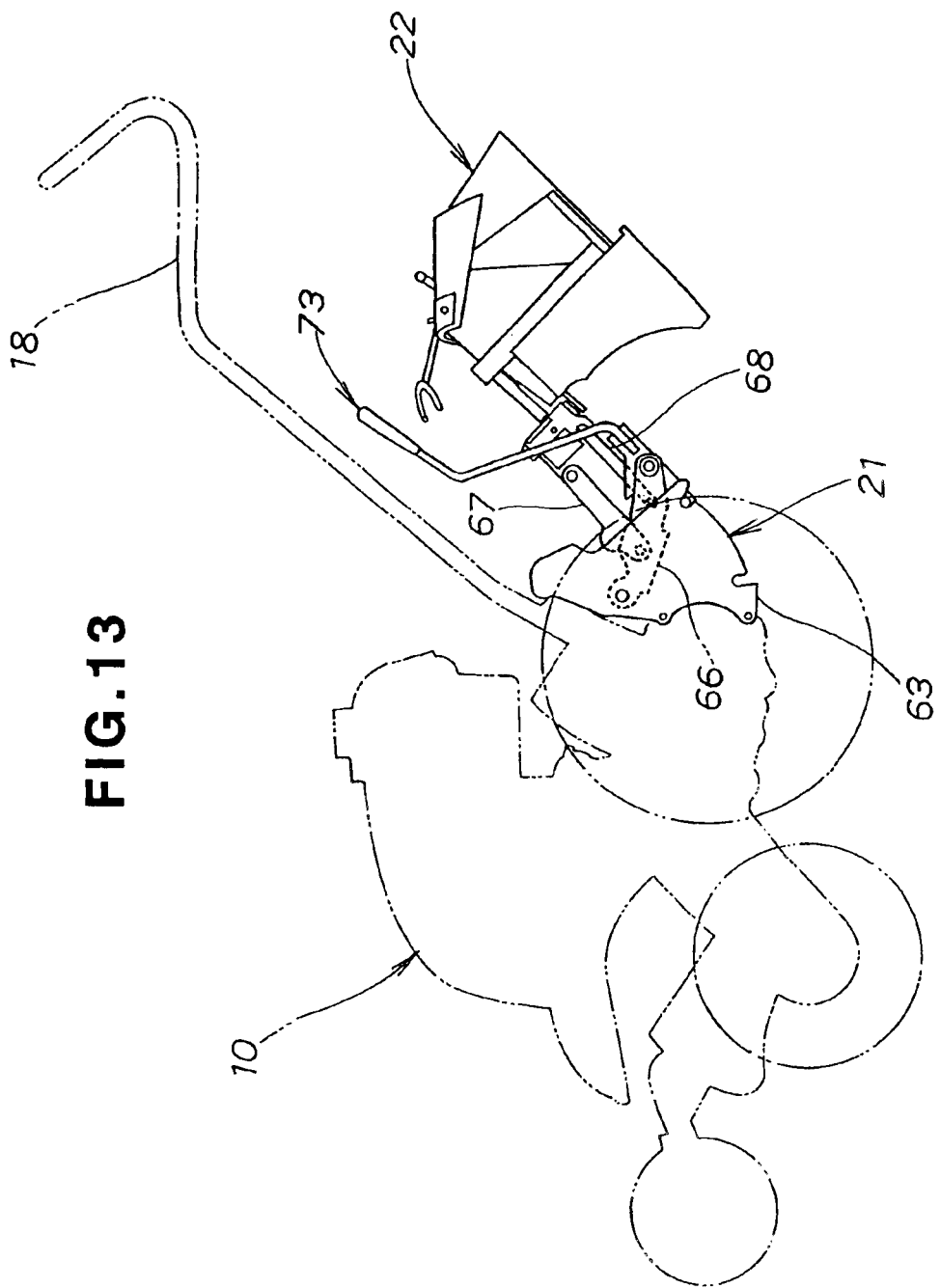
FIG. 13 is a view showing the ridger having been shifted to its raised inoperative position by operation of a shift lever.

FIG. 13 is a view showing the ridger 22 having been raised to its inoperative position by operation of the shift lever 41. In the raised inoperative position, the ridger 22 can make a turn even when the desired agricultural work is under way, or can travel prior to or after the ridging operations.

With the conventional walk-behind agricultural working machines where the parallel upper and lower links of the connection mechanism are merely pivotable upward, it is not be possible to secure a sufficient raised height of a ridger, or it is necessary to increase the lengths of the upper and lower links. In contrast, the connection mechanism 21 employed in the present invention is characterized in that the upper and lower links 67 and 68 are connected to the pivotable base arm 66 and the ridger 22 is raised to its inoperative position by the human operator operating the shift lever 41 to pivot the base arm 66 upwardly. Thus, with the connection mechanism 21, it is possible to secure a sufficient raised height of the ridger 22 without increasing the lengths of the upper and lower links 67 and 68. With the upper and lower links 67 and 68 having relatively short lengths, the raised ridger 22 can be prevented from greatly projecting rearwardly, and it can be located more forwardly of the rear end of the operating handle 18. As a consequence, the ridger 122 even in the raised inoperative position will not hinder the travel of the agricultural working machine 10.

FIGS. 14A–14D are views explanatory of another embodiment of the sunk-down position adjustment unit 76. The same elements as shown in FIGS. 2 and 4 are represented by the same reference numerals and will not be described in detail here to avoid unnecessary duplication.

Figure 14A:
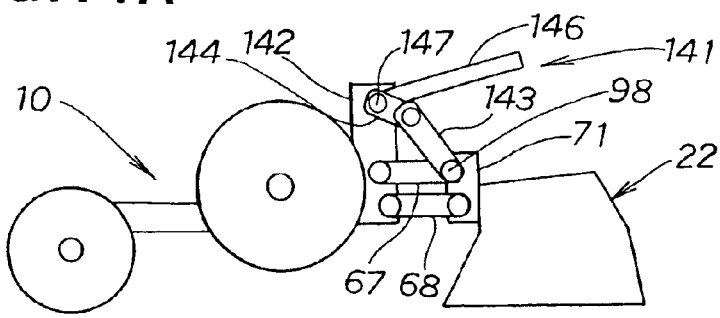
FIGS. 14A–14D are views explanatory of another embodiment of the sunk-down position adjustment unit.

FIG. 14A is a side view showing the ridger 22 connected to the agricultural working machine 10 via a modified connection mechanism 141.

The connection mechanism 141 includes a base member 142 connected to a rear portion of the agricultural working machine 10, upper and lower links 67 and 68 connected to the base member 142 for vertical pivotal movement, and a connection member 71 pivotably connected to the respective rear ends of the upper and lower links 67 and 68 and connectable with a ridger 22 as an attachment. The connection mechanism 141 also includes a first link 143 pivotably connected to the coupling pin 98 coupling the rear end of the upper link 67 to the connection member 71, a second link 144 pivotably connected to one end of the first link 143, and an operating lever 146 pivotably coupled with the second link 144 via a support pin 147 that is provided on the base member 142.

Figure 14B:
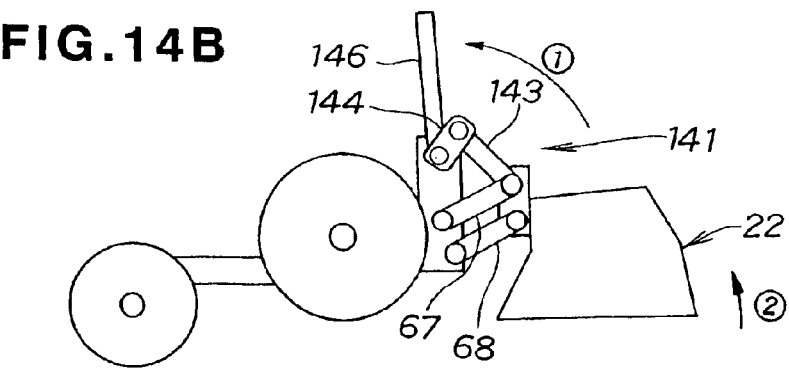

FIG. 14B is a side view explanatory of operation of the operating lever 146. As the operating lever 146 of the connection mechanism 141 is caused to pivot in a direction of arrow 1̂, the upper and lower links 67 and 68 pivot counterclockwise via the second link 144 and first link 143, so that the ridger 22 is raised as indicated by arrow 2̂, i.e. the sunk-down position of the ridger 22 gets higher.

Figure 14C:
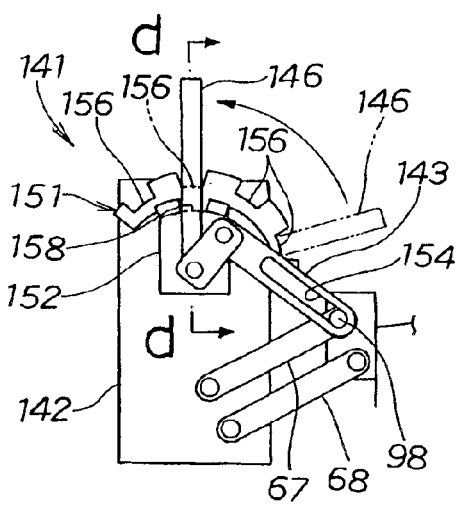

FIG. 14C is a side view of the connection mechanism 141, which includes a curved engagement member 151 attached to the base member 142 and an engagement piece 152 engaging the operating lever 146.

The first link 143 has a longitudinal elongated hole 154 formed therein, and the coupling pin 98 is fitted in the hole 154 for movement along the length of the hole 154.

The engagement member 151 has a plurality of recesses 156 formed therein, and the operating lever 146 is selectively engageable in any one of the recesses 156 so that the operating lever 146 can be locked in a selected position; in this way, the sunk-down position of the ridger 22 can be adjusted. The engagement piece 152 has an upwardly-opening recess 158 for engagement with the operating lever 146 so that it can pivot together with the operating lever 146.

Figure 14D:
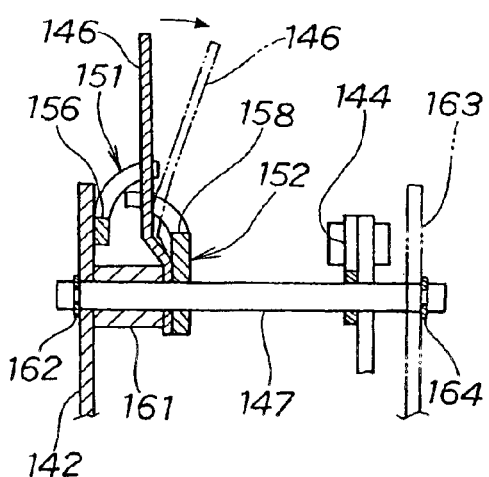

FIG. 14D is a sectional view taken along line d—d of FIG. 14C. The engagement piece 152 having a curved upper portion is mounted on the support pin 147, the support pin 147 is fitted in and extends through one end portion of the operating lever 146, and the operating lever 146 has an intermediate portion engaging with the engagement piece 152. Further, a collar 161 is fitted over the support pin 147 between the operating member 146 and the base member 142 through which one end portion of the support pin 147 extends.

Retaining ring 162 is passed over the one end portion of the support pin 147 projecting outwardly of the base member 142, so as to prevent the support pin 147 from accidentally coming off the base member 142.

The curved engaging member 151 is attached to an upper portion of the base member 142, the second link 144 is mounted on another end portion of the support pin 147, and the other end of the support pin 147 is inserted through another base member 163 provided integrally with the base member 142. Retaining ring 164 is passed over the other end portion of the support pin 147 projecting outwardly of the base member 163, so as to prevent the support pin 147 from accidentally coming off the base member 163.

To change the position of the operating lever 146, the operating lever 146 is first resiliently deformed by the operator to a position indicated by a phantom line, i.e. to a position where the operating lever 146 is disengaged from any one of the recesses 156 of the engagement member 151, and then the operating lever 146 is pivoted into engagement with another one of the recesses 156.

FIG. 15A–FIG. 15D are views further explanatory of the connection mechanism 21, which particularly explains operation of the base arm 66 and upper link 67 constituting the connection mechanism 21.

FIG. 15A shows positions of the base arm 66 and upper link 67 of FIG. 4. Specifically, FIG. 15A shows the base arm 66 in a non-pivoting locked position with the laterally-projecting pin 88 (FIG. 4) of the shift lever 41 (FIG. 4) engaged in the lower recess 91 (FIG. 4). The upper link 67 is shown as being locked in its extreme downward pivoted position with the laterally-projecting pin 74 abutting against the first corner 81a of the first window section 81.

Once a rotational force F to pivot the pivot shaft 72 of the base arm 66 in the counterclockwise direction is applied by the human operator via the shift lever 41, a pressing force F1 acting, for example, from the coupling pin 97 to the laterally-projecting pin 74 (i.e., force F1 with which the laterally-projecting pin 74 presses against the curved upper edge 81d) is produced in a direction from the base arm 66 to the upper arm 67. In the figure, reference character L1 represents a tangent defined when the laterally-projecting pin 74 contacts the curved upper edge 81d of the first window section 81, and C1 represents a component, in the direction of the tangent L1, of the pressing force F1. The component force C1 causes the laterally-projecting pin 74 to move upward along the curved upper edge 81d. Counterclockwise pivoted angle θ of the base arm 66 in the state of FIG. 15A is zero (θ=0), and a counterclockwise pivoted angle φ of the upper link 67 in the state of FIG. 15A is zero (φ=0).

FIG. 15B shows the base arm 66 having been pivoted in the counterclockwise direction from the position of FIG. 15A. At that time, a pressing force F2 acting, for example, from the coupling pin 97 to the laterally-projecting pin 74 is produced due to a rotational force acting on the pivot shaft 72 of the base arm 66. In the figure, reference character L2 represents a tangent defined when the laterally-projecting pin 74 contacts the curved upper edge 81d of the first window section 81, and C2 represents a component, in the direction of the tangent L2, of the pressing force F2. The component force C2 causes the laterally-projecting pin 74 to move upward along the curved upper edge 81d.

FIG. 15C shows the base arm 66 having been pivoted in the counterclockwise direction from the position of FIG. 15B. At that time, a pressing force F3 acting, for example, from the coupling pin 97 to the laterally-projecting pin 74 is produced due to a rotational force acting on the pivot shaft 72 of the base arm 66. In the figure, reference character L3 represents a tangent defined when the laterally-projecting pin 74 contacts the curved upper edge 81d of the first window section 81, and C3 represents a component, in the direction of the tangent L3, of the pressing force F3. The component force C3 causes the laterally-projecting pin 74 to move upward along the curved upper edge 81d.

FIG. 15D shows the base arm 66 having been pivoted in the counterclockwise direction from the position of FIG. 15C. At that time, a pressing force F4 acting, for example, from the coupling pin 97 to the laterally-projecting pin 74 is produced due to a rotational force acting on the pivot shaft 72 of the base arm 66. In the figure, reference character L4 represents a tangent defined when the laterally-projecting pin 74 contacts the curved upper edge 81d of the first window section 81, and C4 represents a component, in the direction of the tangent L4, of the pressing force F4. The component force C4 causes the laterally-projecting pin 74 to move upward along the curved upper edge 81d.

As the laterally-projecting pin 74 is caused to further move upward, it abuts against the third corner 81c of the first window section 81, so that the upward movement of the pin 74 comes to an end.

FIGS. 16A–16C are views further explanatory of the behavior of the connection mechanism 21, which particularly explains operation of the connection mechanism 21 when the ridger 22 is raised to the inoperative position.

FIG. 16A shows the laterally-projecting pin 88 of the shift lever 41 engaged in the lower recess 91 of the base plate 63. At this stage, the laterally-projecting pin 74 of the upper link 67 is held in abutting engagement with the first corner 81a of the first window section 81, and the upper and lower links 67 and 68 are held in their respective extreme downward pivoted positions. Here, "α" represents an inclined angle of a vertical connection axis 71a of the connection member 71 varying as the connection member 71 is pivoted up, and "β" represents a pivoted angle of a longitudinal axis 111a of the lever portion 111 of the shift lever 41. In the illustrated example of FIG. 16A, the inclined angle α and pivoted angle β are both zero (α=0, and β=0).

FIG. 16B shows the laterally-projecting pin 88 disengaged from the lower recess 91 by pivoting the lever portion 111 upwardly from the position of FIG. 16A and then pulling the lever portion 111 obliquely in the rearward and upward direction.

During that time, the base arm 66 pivots counterclockwise about the pivot shaft 64 and the laterally-projecting pin 74 of the upper link 67 moves substantially upward while being guided along the curved edge 81d of the first window section 81; thus, the upper and lower links 67 and 68 pivot upwardly in response to the pivoting movement of the base arm 66.

FIG. 16C shows the laterally-projecting pin 88 having been displaced to a position close to the lower recess 92 from the position of FIG. 16B by the human operator further pulling the lever portion 111 in the rearward and upward direction and then pivoting the lever portion 111 downwardly so as to engage the laterally-projecting pin 88 in the lower recess 92. Namely, FIG. 16C shows the base arm 66 and upper and lower links 67 and 68 having further pivoted upwardly from the positions of FIG. 16B.

At that time, the laterally-projecting pin 74 is in contact with the curved upper edge 81d slightly below the third corner 81c of the first window section 81. Distance or gap between the laterally-projecting pin 74 and the third corner 81c is set to allow for possible manufacturing and assembling errors of the parts, so that, even in cases where the errors are maximum, the laterally-projecting pin 88 can be appropriately engaged in the lower recess 92. Despite the gap between the laterally-projecting pin 74 and the third corner 81c, if the outward opening end of the lower recess 92 is formed to be greater in width than the bottom of the recess 92, the laterally-projecting pin 88 can be readily brought into the lower recess 92, by the human operator pivoting the shift lever 41 in the clockwise direction of the figure when the laterally-projecting pin 74 abuts against the third corner 81c.

Figure 17:
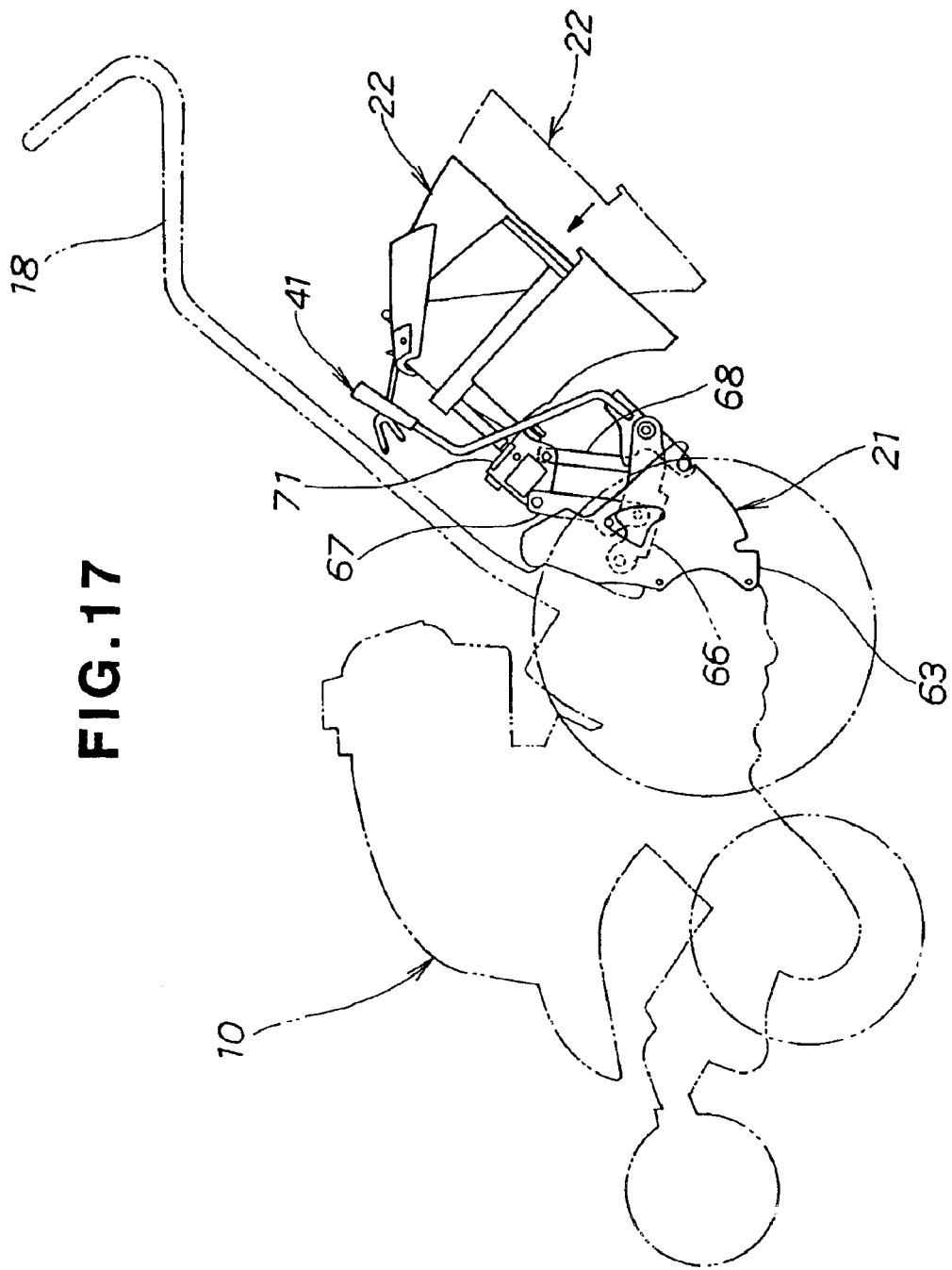
FIG. 17 is a view showing the ridger having been shifted to its raised inoperative position.

FIG. 17 is a view showing the ridger 22 having been shifted to its raised inoperative position by operation of the shift lever 41. In the raised inoperative position, the ridger 22 can make a turn even when the desired agricultural work is under way, or can travel prior to or after the ridging operations.

With the conventional walk-behind agricultural working machines where the parallel, upper and lower links of the connection mechanism are merely pivotable upward, it is not be possible to secure a sufficient raised height of a ridger, or it is necessary to increase the lengths of the links. In contrast, the connection mechanism 21 employed in the present invention is characterized in that the upper and lower links 67 and 68 are connected to the base arm 66 and the ridger 22 is raised by operating the shift lever 41 to cause the base arm 66 upwardly. Thus, with the connection mechanism 21, it is possible to secure a sufficient raised height of the ridger 22 without increasing the lengths of the upper and lower links 67 and 68. With the upper and lower links 67 and 68 having relatively short lengths, the raised ridger 22 can be prevented from greatly projecting rearwardly, and it can be located more forwardly of the rear end of the operating handle 18. As a consequence, the ridger 122 in the raised inoperative position will not hinder the travel of the agricultural working machine 10.

In FIG. 17, a one-dot-dash line indicates a lower end portion of the ridger 22 when the base arm 66 and upper and lower links 67 and 68 have been pivoted upwardly from the position of FIG. 16A.

Figure 18:
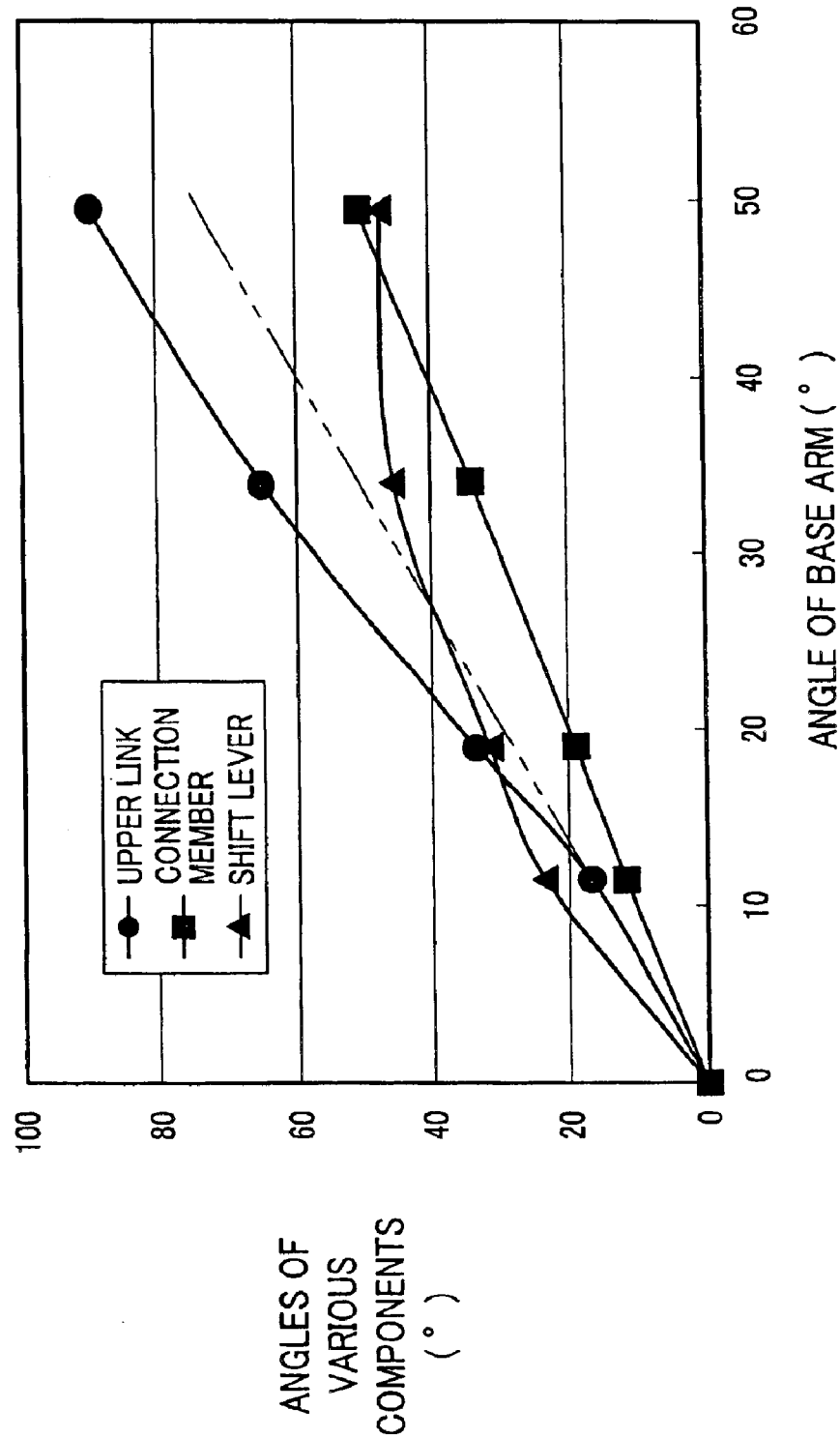
FIG. 18 is a graph showing relationship between a pivoted angle of the base arm and angles of various components of the connection mechanism.
Figure 19A:
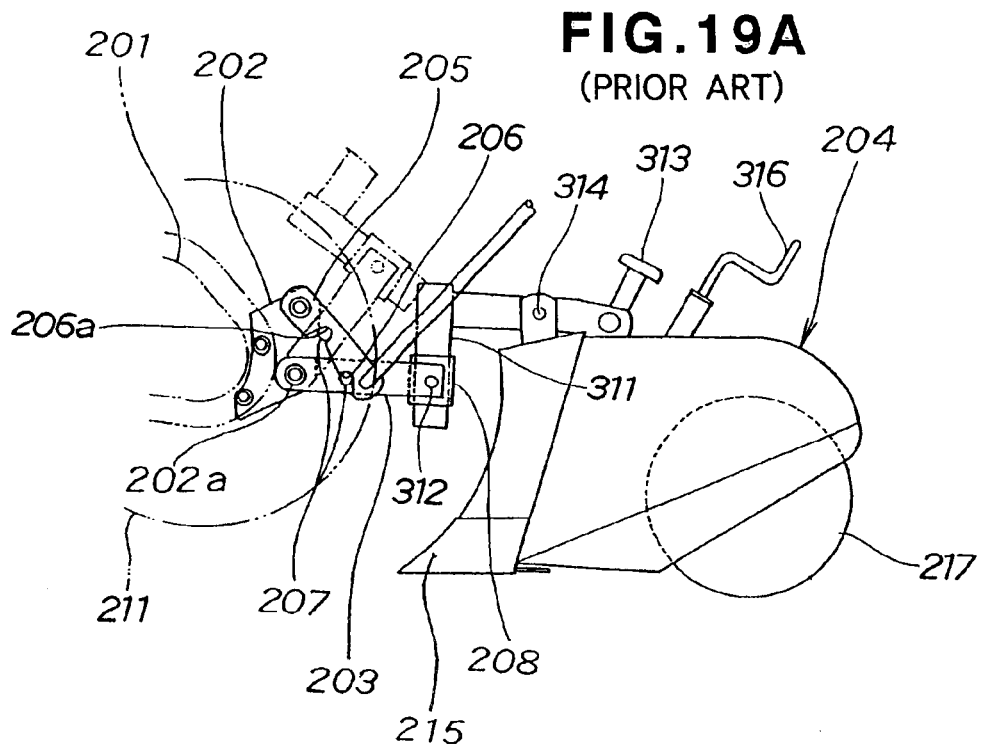
FIG. 19A is a side view showing principal components in a rear section of the conventional walk-behind agricultural working machine and auxiliary working device drawn thereby.
Figure 19B:
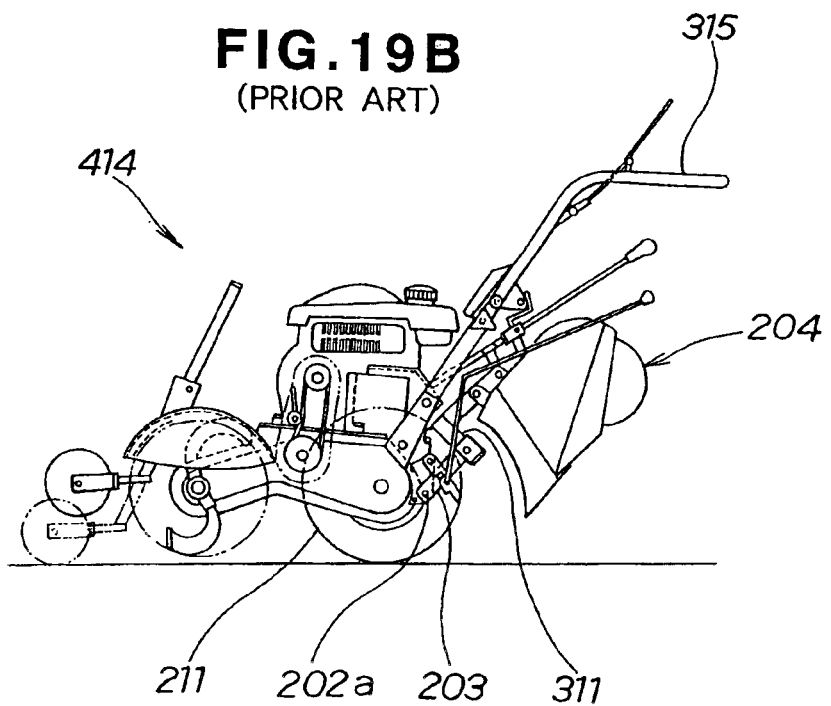
FIG. 19B is a side view showing the auxiliary working device of FIG. 19A shifted to its raised inoperative position.
Figure 20:
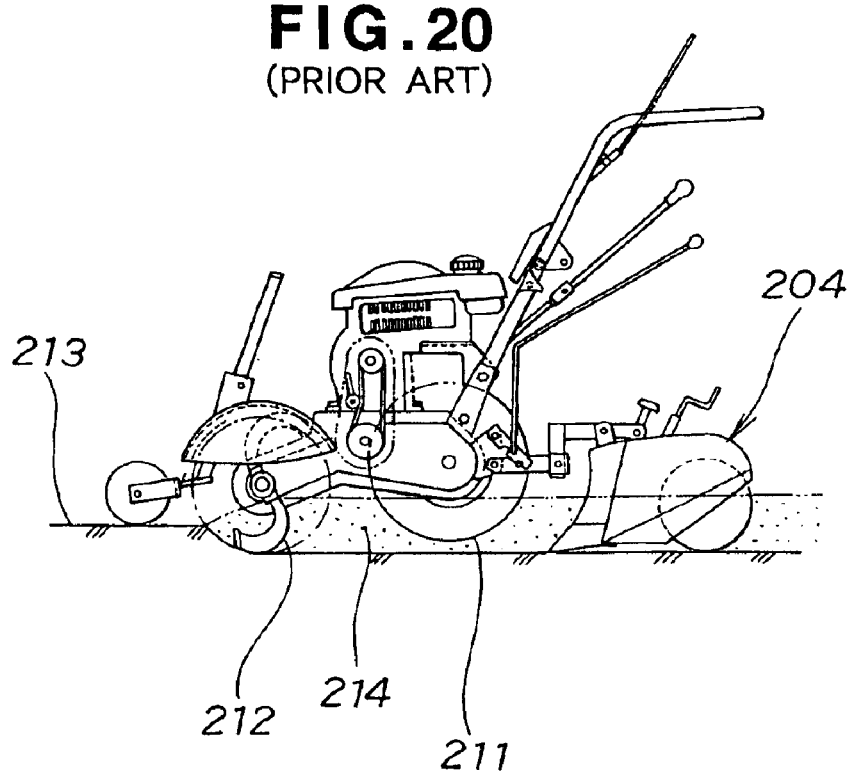
FIG. 20 is a side view showing the conventional walk-behind agricultural working machine and auxiliary working device in its lowered operative position.
Figure 21:
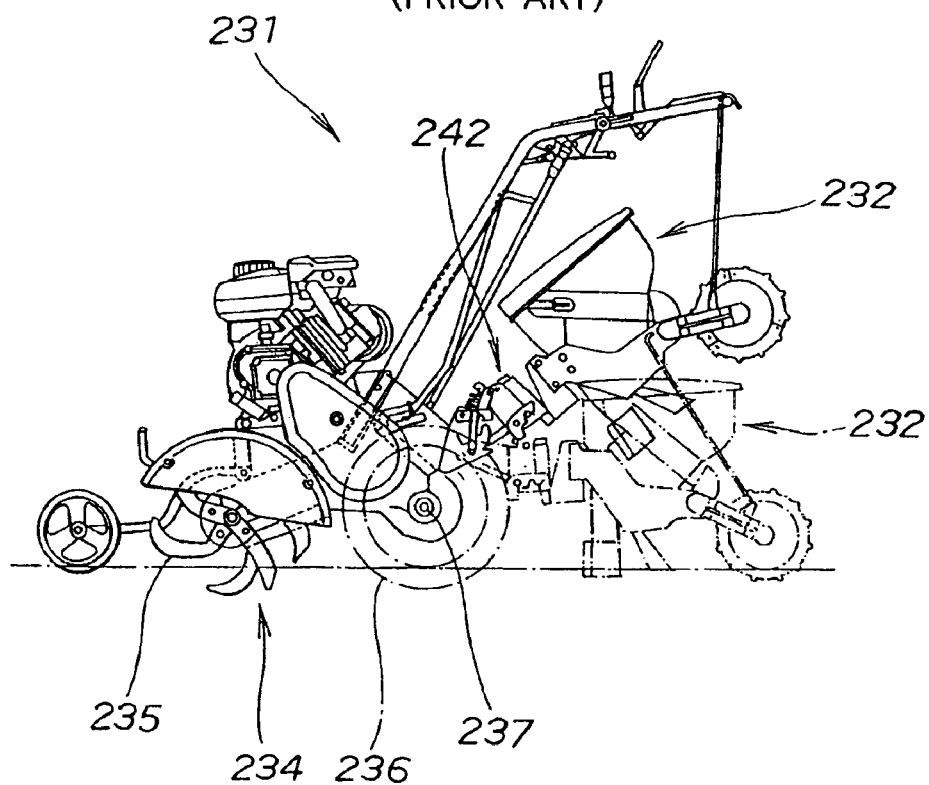
FIG. 21 is a side view showing another conventional walk-behind agricultural working machine and auxiliary working device drawn thereby.

FIG. 18 is a graph showing relationship between the pivoted angle of the base arm 66 and angles of various components of the connection mechanism 21, where the vertical axis represents the angles of various components of the connection mechanism 21 and the horizontal axis represents the pivoted angle of the base arm 66. Note that the pivoted angle of the base arm 66 is the above-mentioned angle θ while the angles of various components of the connection mechanism 21 are the above-mentioned pivoted angle φ of the upper link 67, inclined angle of the connection member 71 and pivoted angle of the shift lever 41 (more specifically, lever portion 111).

The pivoted angle of the upper link 67 increases as the pivoted angle of the base arm 66 increases. More specifically, the pivoted angle of the upper link 67 increases at a greater rate after the pivoted angle of the base arm 66 exceeds about 11°; namely, the increasing rate of the pivoted angle of the upper link 67 becomes greater as the upper link 67 pivots upwardly in accordance with the upward pivoting movement of the base arm 66. Note that a two-dot-dash line in the graph shows a provisional linear increase of the pivoted angle of the upper link 67 for purposes of comparison.

The reason why the increasing rate of the pivoted angle of the upper link 67 becomes greater as the upper link 67 pivots upwardly is that the curved upper edge 81d of the first window section 81 is formed to get closer to the pivot shaft 64 of the base arm 66 in the bottom-to-top direction as noted earlier in relation to FIG. 4. Thus, if the curved upper edge 81d is formed into a circular arc around the pivot shaft 64, the pivoted angle of the upper link 67 will increase at a constant rate.

With the increasing rate of the pivoted angle of the upper link 67 set to become gradually greater as set forth above, the ridger 22 can be raised to a higher inoperative position closer to the agricultural working machine 10; namely, the ridger 22 can be raised as closer to the underside of the operating handle 18 as possible.

Referring back to FIG. 18, the inclined angle of the connection member 71 increases linearly as the pivoted angle of the base arm 66 increases. The increasing rate of the inclined angle of the connection member 71 is about half that of the pivoted angle of the upper link 67. Namely, even when the upper and lower links 67 and 68 greatly pivot upwardly in FIGS. 16A–16C, the inclined angle α of the connection member 71 does not increase so much.

By such operation of the upper and lower links 67 and 68 and connection member 71, and particularly by great upward pivoting movement of the upper and lower links 67 and 68, it is possible to secure a sufficient raised height of the ridger 22. Further, by suppressing the inclined angle of the connection member 71, the ridger 22 attached, as an auxiliary working device, to the agricultural working machine 10 via the connection member 71 can be prevented from being greatly inclined forward; thus, it is possible to prevent the upper end of the ridger 22 from being positioned too high.

Further, the increasing rate of the shift lever 41 gradually decreases as the pivoted angle of the base arm 66 increases; the increasing rate of the shift lever 41 almost levels off after the pivoted angle of the base arm 66 exceeds about 50°.

Note that the upper and lower links 67 and 68 employed in the inventive agricultural working machine 10 may have a curved shape rather than the linear shape, or may have a combination of a plurality of linear shapes.

Further, whereas the engaging member 74 of the connection mechanism 21 is in the form of a pin in the above-described embodiment, it may be provided by bending a part of the upper link 67. Alternatively, the engaging member 74 may be in the form of a claw-shaped member secured to the upper link 67, or a roller rotatably mounted on the upper link 67 for rolling movement along the curved upper edge 81d of the first window section 81.

As set forth above, the walk-behind agricultural working machine 10 of the present invention is of the type where the left and right axles 13a and 14a for the traveling wheels 13 and 14 are secured to rear portions of the power transmission unit 12, the cultivator devices 15 and 16 are mounted in front of the left and right axles 13a and 14a and an auxiliary working device, such as a ridger 22, is connectable via the connection mechanism 21 to a rear end portion of the power transmission unit 12 behind the left and right axles 13a and 14a. As seen in FIGS. 6–8, the walk-behind agricultural working machine 10 of the present invention is characterized in that the upper and lower links 67 and 68 are pivotably connected at their respective one ends to a rear portion of the power transmission unit 12 and connected at their respective other ends to the auxiliary working device (e.g., ridger 22) in such a manner that, when the auxiliary working device connected to the transmission unit 12 and the traveling wheels 13 and 14 are in the soil contacting position prior to initiation of desired agricultural work, end portions of the upper and lower links 67 and 68 adjacent to the ridger 22 are located higher than other end portions adjacent to the power transmission unit 12.

As the machine 10 initiates predetermined operations by drawing the ridger 22 contacting the soil 132, a forward and downward traction force T3 can be produced in the upper and lower links 67 and 68 having the ends of the upper and lower links 67 and 68 adjacent to the ridger 22 located higher than the other ends adjacent to the power transmission unit 12, and the ridger 22 can gradually sink down into the soil 132 due to a vertically-downward component T4 of the traction force T3. Further, when the ridger 22 has further sunk down into the soil 132 to the extent that the upper and lower links 67 and 68 are held in a substantially horizontal position, generally the same sunk-down depth of the ridger 22 can be kept because the vertically-downward component T4 of the traction force T3 no longer acts on the ridger 22.

Such arrangements can eliminate the need for the human operator to depress the operating handle 18 in order to cause the ridger 22 to sink down into the soil and the need to adjust the handle-depressing force through experience, guess etc., thereby facilitating the operations by the ridger 22 and reducing loads on the human operator. Further, the described arrangements can keep the ridger 22 at an appropriate sunk-down position and thereby achieve a stabilized working depth. In this way, the present invention can form ridges with a uniform height and avoid variations in growth of crops.

Further, as seen in FIGS. 2, 10A, 10B, 11A and 11B, the inventive agricultural working machine 10 is characterized in that the connection mechanism 21 includes the link mechanism 78 for permitting vertical movement of a predetermined portion adjacent to the ridger 22 (specifically, connection member 71) with respect to the power transmission unit 12 (specifically, base plate 41 and base arm 66 of FIG. 4) and in that the link mechanism 78 includes the sunk-down position adjustment unit 76 for controlling the lower limit position of a portion of the connection mechanism adjacent to the ridger 22 and thereby controlling the lower limit position of the ridger 22. With such arrangements, the present invention can control and restrict the sunk-down depth of the ridger 22 in the soil during the ridging operations and thereby form ridges of a uniform height.

In contrast to the conventionally-known agricultural working machine where sufficient skills and experiences of a human operator are required to set a sunk-down depth of a machine-drawn ridger, the present invention allows a desired sunk-down depth of the ridger 22 to be readily set by means of the sunk-down position adjustment unit 76, thereby eliminating the need for skills and experiences of the human operator and achieving enhanced workability of the ridger 22. Also, the present invention can eliminate the need for the human operator to manually depress the ridger 22 to a desired sunk-down depth, thereby achieving not only enhanced workability of the agricultural working machine 10 but also reduced loads on the human operator.

The inventive agricultural working machine 10 is also characterized in that the sunk-down position adjustment unit 76 includes the L-shaped link 114 pivotably connected at one end to the upper or lower link 67 or 68, the additional upper link 116 pivotably connected to the other end of the L-shaped link 114 and the engagement pin 82 provided on the additional upper link 116 for engagement with the power transmission unit 12 (specifically, any one of the upper recesses 83–85 in the base plate 63) so that the height of a predetermined portion of the upper or lower link 67 or 68 adjacent to the ridger 22 can be selectively changed via the additional upper link 116 and L-shaped link 114.

With the arrangements that the engagement pin 82, constituting the sunk-down position adjustment unit 76, is engageable with any desired one of the upper recesses 83–85 in the base plate 63 and that the upper and lower links 67 and 68 of substantially the same effective operating length are provided in parallel relation to each other, the lower limit position of the ridger 22 can be changed by just vertically moving the ridger 22 via the upper and lower links 67 and 68 without the posture of the ridger 22 being changed so much. As a result, the present invention can significantly enhance the workability of the ridger 22 at each selected lower limit position of the ridger 22.

Further, because the lower limit position of the ridger 22 can be adjusted by just changing the engaged position of the pin 82, the present invention allows the sunk-down position of the ridger 22 to be adjusted with ease. Thus, with the present invention, it is possible to readily set an appropriate sunk-down position of the ridger 22 depending on the type of the auxiliary working device to be connected to the machine 10, soil conditions, crop to be raised, etc.

The inventive agricultural working machine 10 is also characterized in that the connection mechanism 21 includes the base plate 63 provided on the power transmission unit 12, the base arm 66 vertically pivotably connected to the base plate 63, the upper and lower links 67 and 68 being vertically pivotably connected at the respective one ends to upper and lower end portions of the base arm 66 and the connection member 71 connected to the respective other ends of the upper and lower links 67 and 68, and in that the connection member 71 is vertically movable by causing the base arm 66 to pivot vertically with the laterally-projecting pin 74 guided along the curved upper edge 81d of the first window section 81 formed in the base plate 63.

Thus, the upper and lower links 67 and 68 can be pivoted together with the base arm 66, so that the end portion of the working device adjacent to the connection member 71 can be raised to a higher position than in the case where only the upper and lower links are pivoted to move the end portion upwardly. As a result, the present invention can secure a sufficient raised height of the ridger 22.

Further, the present invention can reduce the overall weight of the machine 10 by eliminating the need for increasing the lengths of the upper and lower links 67 and 68, thereby achieving enhanced maneuverability and operability of the machine 10. Because the upper and lower links 67 and 68 are shorter in length than the conventional counterparts, the ridger 22 can be positioned closer to the body of the machine 10, leaving a sufficient space in front of the legs and feet of the human operator. The sufficient space can lead to enhanced workability of the machine 10. Furthermore, with the upwardly-pivotable base arm 66, the upper and lower links 67 and 68 can be pivoted over a greater range than in the case where no such pivotable base arm is provided, with the result that the present invention allows the ridger 22 to be raised to a higher inoperative position farther away from the soil.

Moreover, the use of the pivotable base arm 66 in the connection mechanism 21 allows the raised inoperative position of the ridger 22 to be closer to the engine 11 and power transmission unit 12 than in the conventionally-known agricultural working machines. Thus, the center of weight of the agricultural working machine 10 having the ridger 22 connected thereto can be put more forwardly, so that the mass can be concentrated at the center of the machine 10. As a result, the present invention allows the machine 10 to make turns with increased ease, thereby enhancing the maneuverability of the machine 10 and reducing loads on the human operator.

Obviously, various minor changes and modifications of the present invention are possible in the light of the above teaching. It is therefore to be understood that within the scope of the appended claims the invention may be practiced otherwise than as specifically described.

What is claimed is:

1. A walk-behind agricultural working machine comprising:
    a machine body having a front section and a rear section;
    an axle mounted on the rear section of the machine body for undergoing rotation;
    a wheel mounted on the axle for undergoing rotation therewith to move the walk-behind agricultural working machine along a ground surface selectively in a forward direction and in a reverse direction;
    a cultivator device mounted on the machine body and forwardly of the axle;
    a working device attachment removably connected to the rear section of the machine body; and
    a connection mechanism disposed on the rear section of the machine body and rearwardly of the axle for removably connecting the working device attachment to the rear section of the machine body, the connection mechanism having upper and lower links each pivotally connected at a first end portion thereof to the rear section of the machine body and at a second end portion thereof to the working device attachment;
    wherein when the working device attachment is connected to the machine body and both the working device attachment and the wheel are disposed in contact with the ground surface prior to initiation of desired agricultural work, the first end portions of the upper and lower links disposed closer to the ground surface than the second end portions of the upper and lower links so that when the wheel undergoes rotation and the walk-behind agricultural working machine moves in the forward direction to pull the working device attachment forwardly along the ground surface, a forward and downward traction force is produced in each of the upper and lower links along a longitudinal axis thereof, whereby the working device attachment gradually sinks into the ground surface due to its own weight and to a vertically downward component of the traction force.

2. A walk-behind agricultural working machine as claimed in claim 1; wherein the connection mechanism has a vertically-moving unit for permitting vertical movement of a predetermined portion thereof adjacent to the working device attachment with respect to the machine body, and a lower-limit-position control unit for controlling a lower limit position of the predetermined portion to restrict a sunk-down depth of the working device attachment in the soil during the desired agricultural work.

3. A walk-behind agricultural working machine as claimed in claim 2; wherein the vertically-moving unit includes the upper and lower links of the connection mechanism; and wherein the lower-limit-position control unit of the connection mechanism has a first link connected at one end to one of the upper link and the lower link, a second link pivotally connected to another end of the first link, and an engagement member disposed on the second link for engagement with the machine body so that a distance of the second end portion of the corresponding upper link and lower link from the ground surface can be selectively varied via the first and second links.

4. A walk-behind agricultural working machine as claimed in claim 1; wherein the connection mechanism has a base member connected to the machine body, an arm pivotally connected to the base and having upper and lower end portions pivotally connected to the first end portion of respective ones of the upper and lower links; a connection member connected to the second end portion of the upper and lower links for connecting the working device attachment to the machine body, an engaging member disposed on the upper link and pivotally connected to the arm, and a window section formed in the base member for receiving the engaging member for movement along an edge of the window section while the engaging member undergoes pivotal movement with the arm to thereby move the working device attachment in a vertical direction relative to the machine body.

5. A walk-behind agricultural working machine as claimed in claim 1; further comprising an operating handle extending from the rear section of the machine body for gripping by an operator to maneuver the walk-behind agricultural working machine along the ground surface.

6. A walk-behind working machine comprising:

a machine body;

a wheel mounted on the machine body for undergoing rotation to move the walk-behind working machine along a ground surface;

a cultivator device mounted on the machine body for cultivating the ground during a cultivating operation;

a working device attachment removably connected to the machine body for working the ground during a working operation independently from or during the cultivating operation; and a connection mechanism for removably connecting the working device attachment to the machine body, the connection mechanism having a pair of link members each pivotally connected at a first end portion thereof to the machine body and at a second end portion thereof to the working device attachment, and a control unit for controlling a position of the working device attachment with respect to the ground surface so that when the working device attachment contacts the ground surface prior to a working operation, the first end portions of the link members are disposed closer to the ground surface than the second end portions of the link members.

7. A walk-behind working machine according to claim 6; wherein when the wheel undergoes rotation, the walk-behind machine and the working device attachment are moved along the ground surface and a traction force in the direction of the ground surface is produced in each of the link members to gradually drive the working device attachment into the ground surface.

8. A walk-behind working machine according to claim 6; wherein the link members comprise a first link member and a second link member; and wherein the connection mechanism has a third link member connected at one end thereof to one of the first and second link members, a fourth link member pivotally connected to another end of the third link member, and an engagement member disposed on the fourth link member for engagement with the machine body so that a distance of the second end portion of the corresponding first and second link member from the ground surface can be selectively varied via the third and fourth link members.

9. A walk-behind working machine according to claim 6; further comprising an operating handle extending from the machine body for gripping by an operator to maneuver the walk-behind agricultural working machine along the ground surface.

10. A walk-behind working machine according to claim 6; further comprising an operating handle extending from the machine body for gripping by an operator to maneuver the walk-behind agricultural working machine along the ground surface; and wherein when the wheel undergoes rotation, the walk-behind machine and the working device attachment are moved along the ground surface and a traction force in the direction of the ground surface is produced in each of the link members to gradually drive the working device attachment into the ground surface without requiring the operator to depress the operating handle in order to drive the working device attachment into the ground surface.

* * * * *